US012634927B2

(12) United States Patent　　　　(10) Patent No.:　US 12,634,927 B2
Fu et al.　　　　　　　　　　　　　　(45) Date of Patent:　　May 19, 2026

(54) UPLINK TRANSMISSION METHOD, TERMINAL, AND STORAGE MEDIUM

(71) Applicant: GUANGDONG OPPO MOBILE TELECOMMUNICATIONS CORP., LTD., Guangdong (CN)

(72) Inventors: Zhe Fu, Guangdong (CN); Qianxi Lu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 380 days.

(21) Appl. No.: 18/341,736

(22) Filed: Jun. 26, 2023

(65) Prior Publication Data

US 2023/0337228 A1　　Oct. 19, 2023

Related U.S. Application Data

(63) Continuation of application No. PCT/CN2021/071579, filed on Jan. 13, 2021.

(51) Int. Cl.
　H04L 5/00　　　(2006.01)
　H04L 1/1822　　(2023.01)
　　　　(Continued)

(52) U.S. Cl.
　CPC ....... H04W 72/1268 (2013.01); H04L 1/1822 (2013.01); H04W 72/23 (2023.01); H04W 74/0808 (2013.01); *H04L 1/1812* (2013.01)

(58) Field of Classification Search
　CPC .............. H04L 1/1822; H04L 1/1812; H04W 72/1268; H04W 72/23; H04W 74/0808; H04W 72/115
　See application file for complete search history.

(56) References Cited

U.S. PATENT DOCUMENTS

2019/0074935 A1*　3/2019　Babaei ................. H04L 1/1812
2020/0314889 A1　10/2020　Cirik
　　　　　(Continued)

FOREIGN PATENT DOCUMENTS

CN　　110035543 A　　7/2019
CN　　111800887 A　　10/2020
　　　　　(Continued)

OTHER PUBLICATIONS

3GPP TS 38.321 V16.2.1 (Sep. 2020) 3rd Generation Partnership Project;Technical Specification Group Radio Access Network;NR;Medium Access Control (MAC) protocol specification(Release 16)(153 pages).

(Continued)

*Primary Examiner* — Lan-Huong Truong
(74) *Attorney, Agent, or Firm* — Ladas & Parry, LLP

(57)　　　　ABSTRACT

An UL transmission method, a terminal, and a storage medium. The method comprises: performing, by a terminal device, a second UL transmission on a second resource based on resource configuration information and/or a state associated with a first UL transmission; wherein the resource configuration information comprises at least one of a Configured Grant Repeat Timer (CGRT) configuration and an automatic transmission configuration, and the first UL transmission is performed on a first resource; wherein the first resource is a Dynamic Grant (DG) resource or a Configured Grant (CG) resource in a shared band, the second resource is the DG resource or the CG resource in the shared band, and the first resource is prior to the second resource in a time domain.

16 Claims, 4 Drawing Sheets

(51) Int. Cl.

| | |
|---|---|
| *H04W 72/1268* | (2023.01) |
| *H04W 72/23* | (2023.01) |
| *H04W 74/0808* | (2024.01) |
| *H04L 1/1812* | (2023.01) |

(56) References Cited

U.S. PATENT DOCUMENTS

| | | | | |
|---|---|---|---|---|
| 2023/0269036 A1* | 8/2023 | Fan | ....................... | H04L 1/1854 |
| 2023/0309142 A1* | 9/2023 | Tooher | ............. | H04W 74/0808 |
| 2023/0337225 A1* | 10/2023 | Alfarhan | ............. | H04W 72/232 |
| 2023/0413320 A1* | 12/2023 | Singh | ............... | H04W 74/0875 |

FOREIGN PATENT DOCUMENTS

| | | |
|---|---|---|
| CN | 114286361 A | 4/2022 |
| CN | 114930966 A | 8/2022 |
| WO | 2018211364 A1 | 11/2018 |
| WO | 2020143773 A1 | 7/2020 |
| WO | 2022151087 A1 | 7/2022 |

OTHER PUBLICATIONS

Qualcomm Incorporated, "[AT112e][501][IIoT]: Summary of URLLC in unlicensed controlled environment," 3GPP TSG-RAN WG2 Meeting #112e R2-2010836 (Nov. 13, 2020), all pages.

OPPO, "Consideration on URLLC over NRU," 3GPP TSG-RAN WG2 #112-e R2-2009562 (Nov. 30, 2020), all pages.

International Search Report for the international patent Application No. PCT/CN2021/071579, mailed Oct. 12, 2021.

Written Opinion of the International Searching Authority in International Application No. PCT/CN2021/122707, mailed Oct. 12, 2021. With machine English translation provided by WIPO.

Interdigital: "IIoT operation in unlicensed controlled environments" ,3GPP Draft; R2-2010110, Oct. 23, 2020 (4 pages).

European Search Report from the corresponding European Patent Application No. 21918302.7, mailed Jan. 3, 2024 (9 pages).

* cited by examiner

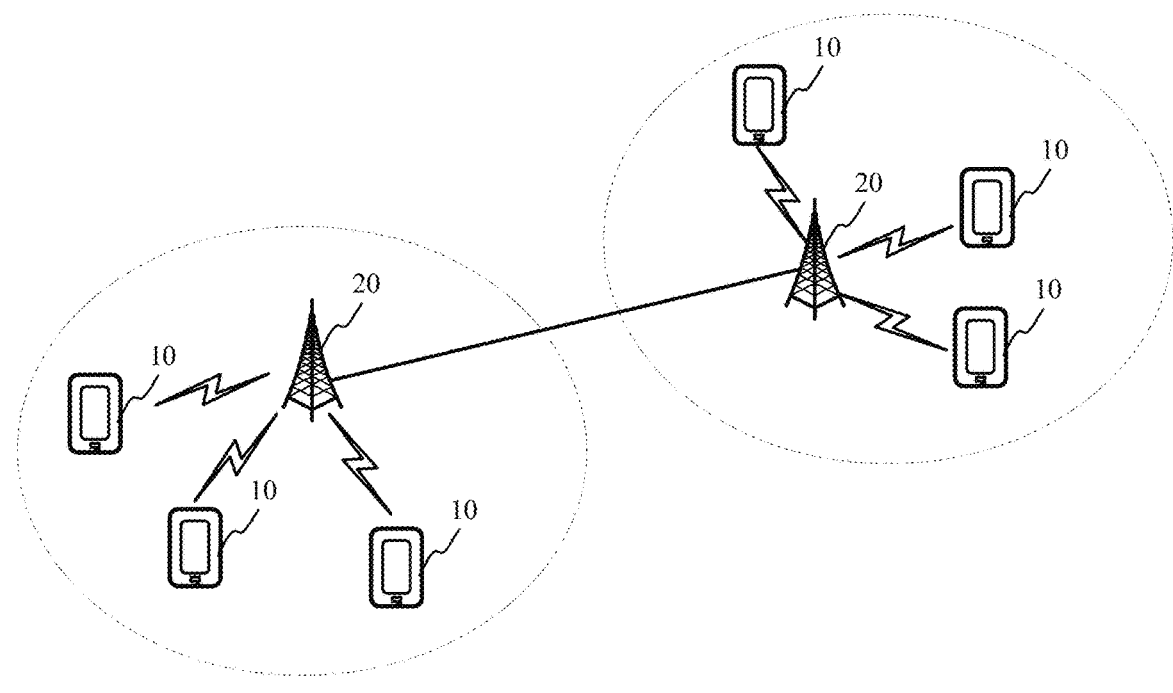

FIG. 1 performing, by the terminal device, a second UL transmission on a second
resource based on resource configuration information and/or a state associated
with a first UL transmission, wherein the resource configuration information
includes at least one of a CGRT configuration and an automatic transmission
configuration, and the first UL transmission is performed on a first resource

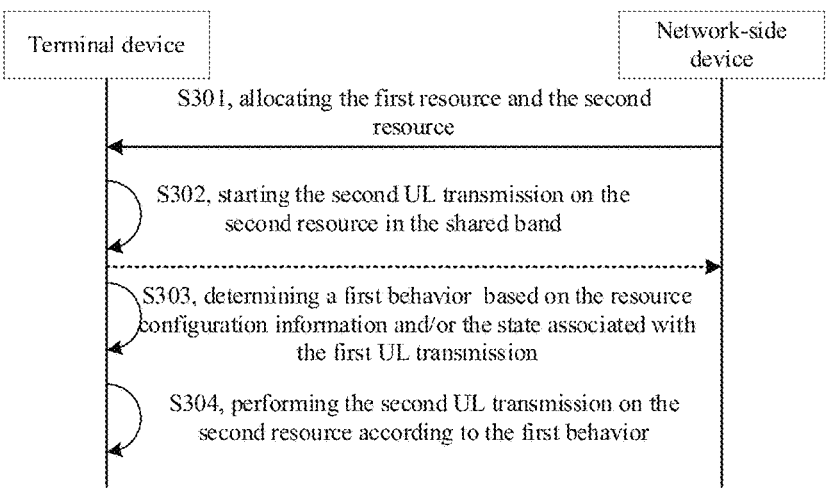

Terminal device

Network-side
device

S301, allocating the first resource and the second
resource

S302, starting the second UL transmission on the
second resource in the shared band S303, determining a first behavior based on the resource
configuration information and/or the state associated with
the first UL transmission S304, performing the second UL transmission on the
second resource according to the first behavior

FIG. 3

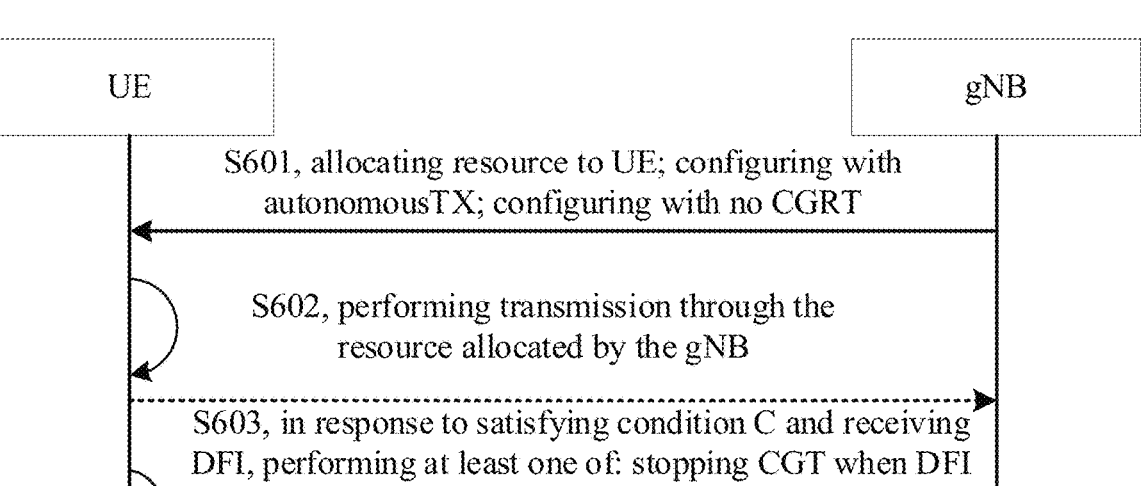

| UE | gNB |

S601, allocating resource to UE; configuring with autonomousTX; configuring with no CGRT S602, performing transmission through the resource allocated by the gNB S603, in response to satisfying condition C and receiving DFI, performing at least one of: stopping CGT when DFI indicates ACK, and/Or, determining transmission to be completed; stopping CGT when DFI indicates NACK, performing autonomousTX, determining that the transmission is uncompleted, determining the resource to be the low-priority resource, determining that MAC PDU is acquired, requiring no MAC PDU to be acquired from the multiplexed packetized unit, and performing new transmission

FIG. 6

| UE | gNB |

S701, allocating resource to UE; configuring with autonomousTX; configuring with CGRT S702, performing transmission through the resource allocated by the gNB S703, in response to satisfying condition D, for low-priority resource or low-priority MAC PDU, performing at least one of: stopping CGT, stopping CGRT in a case of stopping CGT, determining a status of a HAQRQ process to be not pending, determining that MAC PDU is acquired, determining that no MAC PDU is required to be acquired from the multiplexed packetized unit, and performing new transmission

FIG. 7

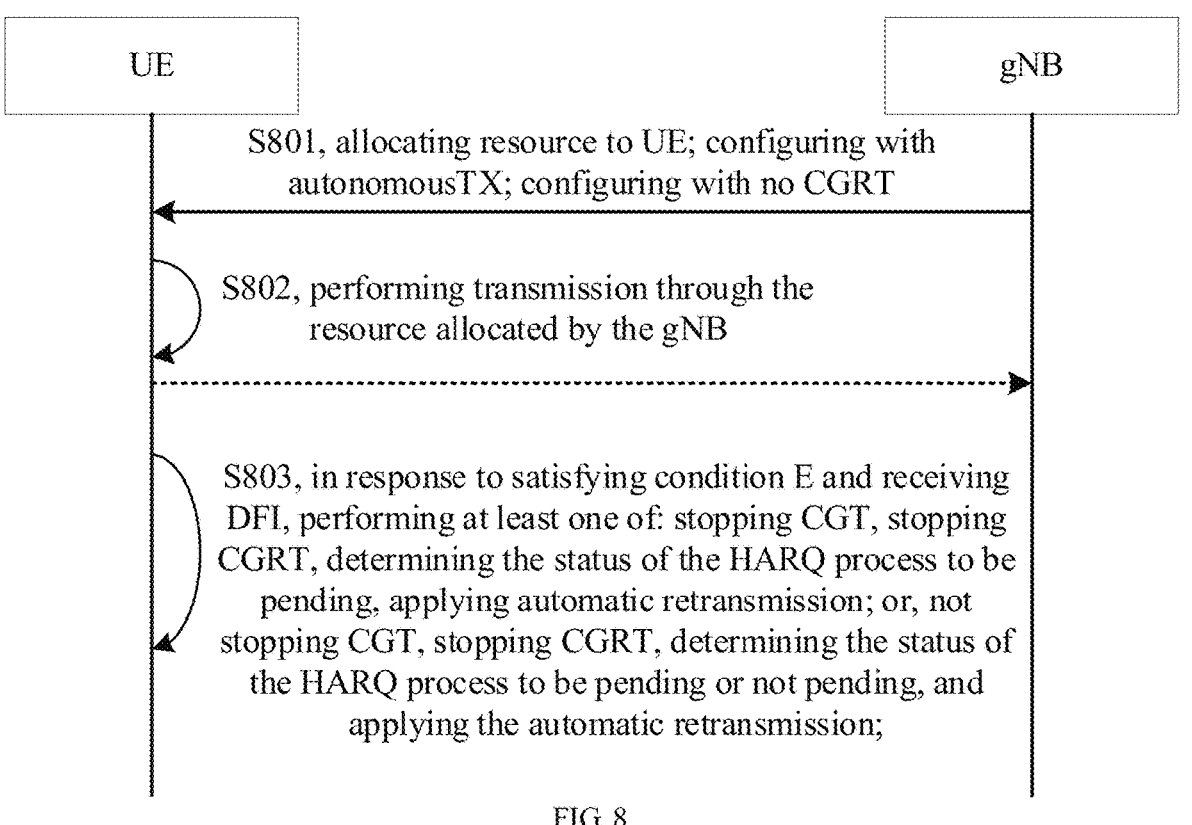

S801, allocating resource to UE; configuring with autonomousTX; configuring with no CGRT S802, performing transmission through the resource allocated by the gNB S803, in response to satisfying condition E and receiving DFI, performing at least one of: stopping CGT, stopping CGRT, determining the status of the HARQ process to be pending, applying automatic retransmission; or, not stopping CGT, stopping CGRT, determining the status of the HARQ process to be pending or not pending, and applying the automatic retransmission;

FIG. 8

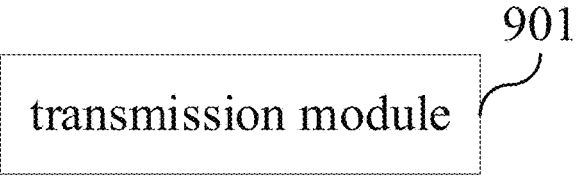

901 transmission module

FIG. 9

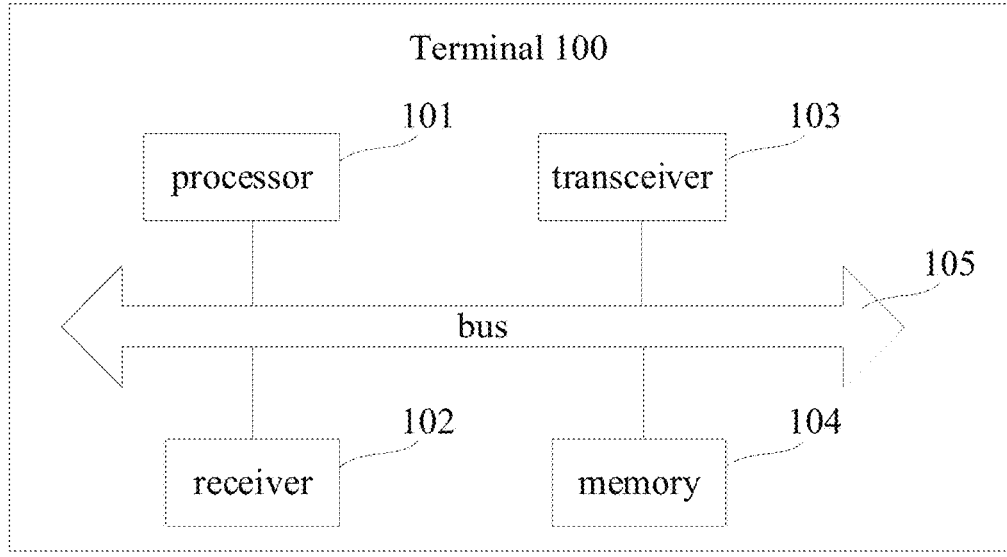

FIG. 10

UPLINK TRANSMISSION METHOD, TERMINAL, AND STORAGE MEDIUM

CROSS REFERENCE TO RELATED APPLICATIONS

The present disclosure is a continuation of International (PCT) Patent Application No. PCT/CN2021/071579 filed on Jan. 13, 2021, the entire contents of which are hereby incorporated by reference in its entirety.

TECHNICAL FIELD

The present disclosure relates to a technical field of communications, and in particular to an uplink (UL) transmission method, a terminal, and a storage medium.

BACKGROUND

In New Radio Unlicensed (NR-U) systems, terminals are allowed to perform UL data transmissions on unlicensed bands.

In the related art, in a case where only an UL transmission resource on one unlicensed band is indicated to a physical layer at the same moment, a terminal detects an idle state of the UL transmission resource on the unlicensed band, and performs an UL transmission on the UL transmission resource in response to detecting that the UL transmission resource is in the idle state.

SUMMARY OF THE DISCLOSURE

An UL transmission method, a terminal, and a storage medium are provided in some embodiments of the present disclosure. The technical solution is as follows.

According to a first aspect, an UL transmission method is provided in some embodiments of the present disclosure. The method includes performing, by a terminal device, a second UL transmission on a second resource based on resource configuration information and/or a state associated with a first UL transmission; wherein the resource configuration information comprises at least one of a Configured Grant Repeat Timer (CGRT) configuration and an automatic transmission configuration, and the first UL transmission is performed on a first resource; wherein the first resource is a Dynamic Grant (DG) resource or a Configured Grant (CG) resource in a shared band, the second resource is the DG resource or the CG resource in the shared band, and the first resource is prior to the second resource in a time domain.

According to a second aspect, a terminal is provided in some embodiments of the present disclosure. The terminal includes a processor, a memory, and a transceiver. The memory is configured to store a computer program. The computer program is configured to be executed by the processor or the transceiver to achieve the above UL transmission method.

According to a third aspect, a computer-readable storage medium is provided in some embodiments of the present disclosure. The storage medium stores a computer program, wherein the computer program is configured to be loaded and executed by a processor or a transceiver to implement the above UL transmission method.

BRIEF DESCRIPTION OF THE DRAWINGS

In order to more clearly illustrate technical solutions in embodiments of the present disclosure, the drawings used in the embodiments will be briefly described below. Apparently, the drawings in the following description are some embodiments of the present disclosure. Those skilled in the art may also obtain other drawings based on these drawings without paying any creative work.

FIG. 1 is a schematic view of a network architecture according to an embodiment of the present disclosure.

FIG. 2 is a flowchart of an UL transmission method according to an embodiment of the present disclosure.

FIG. 3 is a flowchart of the UL transmission method according to an embodiment of the present disclosure.

FIG. 6 is a schematic view of the UL transmission method shown in FIG. 3 according to an embodiment of the present disclosure.

FIG. 7 is a schematic view of the UL transmission method shown in FIG. 3 according to an embodiment of the present disclosure.

FIG. 8 is a schematic view of the UL transmission method shown in FIG. 3 according to an embodiment of the present disclosure.

FIG. 9 is a structural schematic view of an UL transmission apparatus according to an embodiment of the present disclosure.

FIG. 10 is a structural schematic view of a terminal according to an embodiment of the present disclosure.

DETAILED DESCRIPTION

Figures 4, 5:
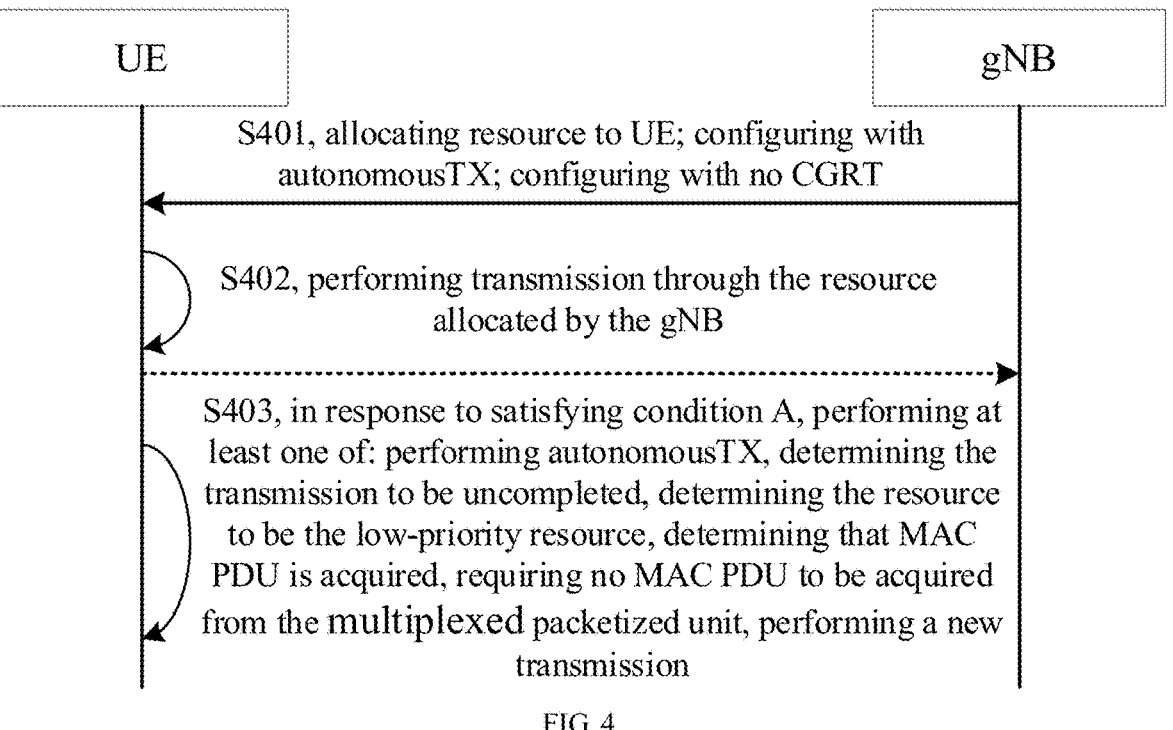
FIG. 4 is a schematic view of the UL transmission method shown in FIG. 3 according to an embodiment of the present disclosure.
FIG. 5 is a schematic view of the UL transmission method shown in FIG. 3 according to an embodiment of the present disclosure.

In order to make the purpose, the technical solution, and advantages of the present disclosure clearer, the embodiments of the present disclosure will be described in detail in conjunction with accompanying drawings in the following.

The network architecture and business scenarios described in some embodiments of the present disclosure are intended to illustrate the technical solution of some embodiments of the present disclosure more clearly and do not constitute a limitation of the technical solution provided in some embodiments of the present disclosure. It is known to a person of ordinary skill in the art that the technical solution provided in some embodiments of the present disclosure is equally applicable to a similar technical problem as the network architecture evolves and new business scenarios emerge.

As shown in FIG. 1, FIG. 1 is a schematic view of a network architecture according to an embodiment of the present disclosure. The network architecture may include a terminal 10 and a base station 20.

The number of terminals 10 is usually multiple. One or more terminals 10 may be distributed within each cell managed by the base station 20. The terminal 10 may include devices having wireless communication functions, such as various handheld devices, various in-vehicle devices, various wearable devices, various computing devices, or other processing devices connected to a wireless modem, and various forms of user equipment (UE), Mobile Stations (MS), terminal devices, or the like. For ease of description, the devices mentioned above are collectively referred to as the terminal in some embodiments of the present disclosure.

The base station 20 is an apparatus deployed in an access network to provide a wireless communication function for the terminal 10. The base station 20 may include various forms of macro base stations, micro base stations, repeater stations, access points, etc. In different systems employing different wireless access technologies, devices with base station functions may have different names. which, e.g., is referred to as gNodeB or gNB in a 5th-Generation (5G) NR system. The name "base station" may vary as communication technology evolves. For convenience of description, the above-mentioned devices providing the wireless communication functions for the terminal 10 are collectively referred to as the base station in some embodiments of the present disclosure.

In an embodiment, not shown in FIG. 1, the network architecture mentioned above may also include other network devices, such as a Central Network Control (CNC), an Access and Mobility Management Function (AMF) device, a Session Management Function (SMF), or a Session Management Function (SMF), or a User Plane Function (UPF) device, or the like.

The term "5G NR system" in some embodiments of the present disclosure may also be referred to as a 5G system or an NR system, and those skilled in the art may understand the meaning of the 5G system or the NR system. The technical solution described in some embodiments of the present disclosure may be applicable to the 5G NR system or a subsequent evolved system of the 5G NR system.

For ease of understanding, some relevant terms involved in the present disclosure are introduced in the following.

1) Ultra-Reliable and Low Latency Communications (URLLC)

URLLC is required to support a service such as a Factory Automation, a Transport Industry, and an Electrical Power Distribution, or the like, to transmit in the 5G system. In order to support a transmission of an URLLC service, a 5G standard has enhanced Configured Grant (CG) (i.e., introduced multiple CG configurations), and enhanced a specific configuration and usage of the CG (e.g., supporting a slot-level cycle, and support an automatic transmission of the CG, etc.).

Considering a need of supporting the URLLC service in an interference-controlled NR-U scenario, the following enhancements may be implemented.

a. a usage manner of enhancing an NRU CG and a URLLC CG in an NR-U scenario;

b. UE-initial Channel Occupancy Time (COT) for a Frame-Based-Equipment (FBE).

2) a CG Enhancement in the URLLC

In order to support a high latency requirement of the URLLC service, the URLLC enhances a CG cycle to support any slot-level service cycle.

In order to support multiple URLLC services and the high latency requirement of the URLLC service, the URLLC also introduces a concept of the multiple CG. Moreover, Hybrid Automatic Repeat ReQuests (HARQ)s with different CG configurations have different processes. harq-ProcID Offset2 is configured to ensure different CGs to have different processes.

Due to existence of conflicts between a CG resource and other resources, in order to ensure that a packetized media access control (MAC) protocol data unit (PDU) in the CG resource (i.e., Deprioritized MAC PDU) is not abandoned, or ensure that the deprioritized MAC PDU is transmitted as soon as possible, an automatic transmission for the CG is introduced. That is, a new transmission may be performed for a CG corresponding to the packetized MAC PDU and failing to be transmitted due to a resource conflict by means of the CG resource in the same CG configuration in a subsequent same HARQ process. For example, an automatic transmission (autonomousTX) is configured to determine to adopt the automatic transmission.

In response to the physical layer having a conflict between different CG resources due to different priorities, the MAC may indicate one or more MAC PDUs to the physical layer. Similarly, in response to a conflict between service data (data) and UL scheduling request (SR), the MAC may also indicate a SR and a MAC PDU to the physical layer.

3) NR-U

A case of the NR operating in a shared band (also referred to as an unlicensed band) includes the following operating scenarios.

Scenario A: a carrier aggregation scenario, where a primary cell (PCell) operates on a licensed band, and a secondary cell (SCell) is aggregated to operate on the unlicensed band (or referred to as the shared band) by means of the carrier aggregation.

Scenario B: a dual-connection operating scenario, where the PCell operates in a Long Term Evolution (LTE) licensed band and SCell operates in an NR unlicensed band.

Scenario C: an independent operating scenario, where NR operates as an independent cell in the unlicensed band.

Scenario D: an NR single-cell scenario, where an UL operates in the licensed band and a downlink (Down Link, DL) operates in the unlicensed band.

Scenario E: a dual-connection operating scenario, where the PCell operates in an NR licensed band and the Scell operates in the NR unlicensed band.

Generally, operating bands of the NR-U include a 5 GHz unlicensed band and a 6 GHz unlicensed band. In the unlicensed bands, the NR-U should be designed or configured to ensure fairness between the NR-U and other systems already operating in these unlicensed bands, such as Wireless Fidelity (Wi-Fi), etc. A principle of the fairness is that an influence of NR-U on the systems (e.g., Wi-Fi) already deployed on the unlicensed bands cannot exceed an influence between the systems.

To ensure fair coexistence of the systems on the unlicensed bands, an energy detection has been identified as a basic coexistence mechanism. A general energy detection mechanism is a Listen Before Talk (LBT) mechanism, a basic principle of which is the base station or the terminal (a transmission side) is required to listen for a period of time according to regulations before transmitting data on the unlicensed bands. When a listening result indicates that a channel listened is idle, the transmission side may transmit the data to a receiving side. When the listening result indicates that the channel is occupied, the transmission side is required to return back for a period of time according to the regulations to continue listening to the channel. No data can be transmitted to the receiving side until the listening result indicates the channel is idle.

Currently, four types of channel-accessing mechanisms (categories) are defined in the NR-U. The four types of the channel-accessing mechanisms include Categories 1-4.

Category 1: Direct Transmission Mechanism

The Direct transmission mechanism is applied to a transmitting (TX) side and allows a rapid transmission after a switching gap within the COT.

The switching gap is a switching time from a receiving moment to a transmitting moment, and a typical value thereof is less than or equal to 16 us.

Category 2: A LBT Mechanism without a Random Back-Off.

This mechanism indicates time for the UE to listen to the channel is determined, which is generally short, e.g. 25 us.

Category 3: a LBT Mechanism with a Random Back-Off (where a Contention Window is Fixed)

In a LBT process, the TX side randomly takes a random value from the competition window to determine the time for listening to the channel.

Category 4: A LBT Mechanism with the Random Back-Off (where the Contention Window is Not Fixed)

In the LBT process, the TX side randomly takes a random value in the contention window to decide the time for listening to the channel, and the contention window is variable.

As can be seen from the above, for the terminal, the base station is required to transmit the data to the terminal within a maximum channel occupation time (Max COT, MCOT). When the base station fails to seize the channel, i.e., outside the MCOT, the terminal will not receive the data scheduled by the base station.

4) UL LBT Failure in the NR-U

An UL transmission initiated by the UE may include the following categories.

SR: configured to request an UL resource.

Physical Random Access Channel (PRACH): triggered by a RACH, the UE being required to send msg1.

Physical Uplink Shared Channel (PUSCH): including a CG-based UL data transmission and a DG-based UL data transmission.

Physical layer signaling transmission: including an Acknowledged (ACK)/non-Acknowledged (NACK) feedback, and Channel State Information (CSI) report, etc.

Before transmitting the SR, the PRACH, or the PUSCH on the unlicensed band, the UE is required to listen whether the channel is available by means of the LBT. When the channel is not available, i.e., the LBT fails, the UE is required to wait for a next transmission chance to perform the LBT again. When it is detected that the LBT fails, a MAC layer is required to be informed of information of the LBT failing.

In the related art, behaviors of the UE processing the UL transmission for different configurations of the CG resource are not clear.

For example, in a case where no CGRT (Configured Grant Repeat Timer) is configured therein but a Downlink Feedback Indication (DFI) is received, and especially the autonomousTX is configured therein, a behavior of the UE processing the UL transmission is unclear.

For another example, in a case where the CGRT is configured and no autonomousTX is configured therein, but Logical Channel (LCH) based (LCH-based) prioritization is configured therein, a behavior of the UE processing a low-priority MAC PDU is unclear.

Subsequent embodiments of the present disclosure provide a solution where the UE processes the UL transmission on the CG resource or a DG resource under different resource configurations.

The technical solution of the present disclosure will be described and illustrated in conjunction with some embodiments in the following.

As shown in FIG. 2, FIG. 2 is a flowchart of an UL transmission method according to an embodiment of the present disclosure. The method may be performed by a terminal device, such as the terminal 10 in a communication system corresponding to the network architecture shown in FIG. 1. The method may include an operation 201.

In an operation 201, the method includes performing a second UL transmission on a second resource based on resource configuration information and/or a state associated with a first UL transmission. The resource configuration information includes at least one of a CGRT configuration and an automatic transmission configuration, and the first UL transmission is performed on a first resource.

The first resource is the DG resource or the CG resource in the shared band, the second resource is the DG resource or the CG resource in the shared band, and the first resource is prior to the second resource in a time domain.

In an embodiment, the UL transmission mentioned above includes an entire or a part of an UL transmitting process on the first resource or the second resource by means of the LBT.

In an embodiment, a process of the UL transmission above may include one of the following processes.

The terminal performs the LBT based on the DG/CG resource, the LBT fails, and the UL transmission is not performed for a MAC PDU corresponding to the DG/CG resource.

Alternatively, the DG/CG resource is a low-priority resource/a conflicting resource/a cancelled resource (further, in this case, the terminal successfully performs the LBT according to the DG/CG resource), and the terminal does not perform the UL transmission for the MAC PDU corresponding to the DG/CG resource.

Alternatively, the DG/CG resource is the low-priority resource/the conflicting resource/the cancelled resource and a permitting conflict occurs (further, in this case, the terminal successfully performs the LBT according to the DG/CG resource), the terminal does not perform the UL transmission for the MAC PDU corresponding to the DG/CG resource.

Alternatively, the DG/CG resource is the low-priority resource/the conflicting resource/the cancelled resource, the permitting conflict occurs, and the LBT fails, the terminal does not perform the UL transmission for the MAC PDU corresponding to the DG/CG resource.

Alternatively, the terminal successfully performs the LBT according to the DG/CG resource and performs the UL transmission for the MAC PDU corresponding to the DG/CG resource, and acquires the DFI. When the DFI indicates the ACK, it indicates that the receiving side successfully receives the MAC PDU. When the DFI indicates the NACK, it means that the receiving side fails to receive the MAC PDU.

In some embodiments of the present disclosure, for the UL transmission described above, the terminal performs a process such as the automatic transmission/an automatic retransmission or a packetized new transmission, etc., in the process of the UL transmission based on a configuration situation of a CGRT and/or the automatic transmission and a state associated with a transmission on a previous resource.

In an embodiment, the resource configuration information mentioned above includes resource configuration information corresponding to the second resource or resource configuration information corresponding to the first resource.

That is, an operation of performing the second UL transmission on the second resource based on the resource configuration information and/or the state associated with the first UL transmission includes:

performing the second UL transmission on the second resource based on the resource configuration information corresponding to the second resource and/or the state associated with the first UL transmission; or performing the second UL transmission on the second resource based on the resource configuration information corresponding to the first resource and/or the state associated with the first UL transmission.

In an embodiment, when the resource configuration information of the first resource is different from the resource configuration information of the second resource, the terminal may perform the second UL transmission for the second resource based on the resource configuration information of the second resource, or based on the resource configuration information of the second resource and the state associated with the first UL transmission prior to the second UL transmission.

Alternatively, when the resource configuration information of the first resource is the same with the resource configuration information of the second resource, the terminal performs the second UL transmission of the second resource based on the resource configuration information of the first resource or the resource configuration information of the second resource; or based on the resource configuration information of the first resource or the resource configuration information of the second resource and the state associated with the first UL transmission prior to the second UL transmission.

Alternatively, when the resource configuration information of the first resource is different from the resource configuration information of the second resource, the terminal performs the second UL transmission of the second resource based on the resource configuration information of the first resource prior to the second resource, or based on the resource configuration information of the first resource and the state associated with the first UL transmission prior to the second UL transmission.

In another embodiment, the terminal may also perform the second UL transmission for the second resource based on the state associated with the first UL transmission prior to the second UL transmission.

In summary, some embodiments of the present disclosure provide a solution of performing the UL transmission on a current CG resource or a current DG resource based on different resource configuration information and/or the state associated with a previous UL transmission. In this way, the terminal behaviors on the DG resource or the CG resource under different cases may be clarified. Consequently, it ensures that data which has not been transmitted or data which has not been completely transmitted to be retransmitted, such that a data loss is avoided. Alternatively, it ensures that the new data is transmitted first. In this way, the utilization rate of the DG resource or the CG resource may be improved, and thus the UL transmission efficiency on the DG resource or the CG resource of the shared band may be improved.

As shown in FIG. 3, FIG. 3 is a flowchart of the UL transmission method according to an embodiment of the present disclosure. The method may be performed by the terminal device and a network-side device, interactively. The terminal device may be the terminal 10 in the communication system corresponding to the network architecture shown in FIG. 1, and the network-side device may be the base station 20 in the communication system corresponding to the network architecture shown in FIG. 1. The method may include operations S301-S304.

In an operation S301, the method includes the network-side device allocating the first resource and the second resource to the terminal device.

In an embodiment, the first resource is the DG resource or the CG resource, and the second resource is also the DG resource or the CG resource. The first resource is prior to the second resource in the time domain.

In an embodiment, both the first resource and the second resource belong to the same CG resource configuration; or the first resource and the second resource belong to different CG resource configurations, respectively.

In an embodiment, the network-side device may allocate the first resource and the second resource to the terminal respectively at different times; or the network-side device may also allocate the first resource and the second resource to the terminal at the same time.

In an embodiment, the network-side device may allocate the first resource and the second resource to the terminal in the same configuration message; or the network-side device may also allocate the first resource and the second resource to the terminal through different configuration messages.

In some embodiments of the present disclosure, the network-side device, such as the base station, may schedule the DG resource or the CG resource employed for the UL transmission on the shared band for the terminal.

In some embodiments of the present disclosure, the network-side device may also be configured with at least one of the CGRT and the autonomousTX; or, the network-side device may also be not configured with the CGRT and the autonomousTX.

In an embodiment, the resource configuration information is whether the CGRT and/or the autonomousTX is configured therein.

In some embodiments of the present disclosure, the DG/CG resource configured by the network-side device for the terminal may include multiple resources. Different DG/CG resources may have the same resource configuration information, or may also have different resource configuration information.

In an operation S302, the method includes the terminal device starting the second UL transmission on the second resource in the shared band.

In some embodiments of the present disclosure, the terminal performs the first UL transmission on the first resource (including a case such as the transmission of the MAC PDU being completed, the MAC PDU being un-transmitted, or the MAC PDU being transmitted but the transmission being uncompleted). Subsequently, when the second resource is available, the terminal may start the second UL transmission on the second resource in the shared band.

An exemplary process of the above UL transmission may include the following operations S302a-S302e.

In an operation S302a, the process includes acquiring the MAC PDU corresponding to the current DG resource/CG resource.

In an operation S302b, the process includes listening to the current DG resource/CG resource by means of the LBT; and not performing the UL transmission in response to the LBT failing; otherwise, proceeding an operation S302c.

In the operation S302c, the process includes aborting the UL transmission in response to the current DG resource/CG resource being the low-priority resource, the conflicting resource, or the cancelled resource, even if the LBT succeeds at the same time; otherwise, proceeding an operation S302d.

Alternatively, the terminal device may also perform a LBT detection or listen to the current DG resource/the current CG resource in response to the current DG resource/the current CG resource being not the low-priority resource, the conflicting resource, or the cancelled resource.

In the operation S302d, the process includes sending the MAC PDU mentioned above on the current DG resource/CG resource.

In an operation S302e, the process includes receiving the DFI.

In an operation S303, the method includes the terminal device determining a first behavior corresponding to the second UL transmission based on the resource configuration information and/or the state associated with the first UL transmission.

The first UL transmission is performed on the first resource.

In some embodiments of the present disclosure, the state associated with the UL transmission mentioned above is at least one of the following conditions corresponding to the UL transmission:

whether a resource corresponding to the UL transmission is the low-priority resource, the conflicting resource, or the cancelled resource; whether a conflict indication is acquired;

whether the LBT fails (e.g., an LBT failure indication is acquired); whether the DFI indicating the ACK/NACK is received; and whether an instruction of processing the MAC PDU or the resource is received, or the like.

A behavior corresponding to the UL transmission may include the automatic transmission, the automatic retransmission, or the packetized new transmission. The resource configuration information includes at least one of the CGRT configuration and the automatic transmission configuration.

In some embodiments of the present disclosure, the terminal may determine the behavior of the second UL transmission to be the automatic transmission, the automatic retransmission, or the packetized new transmission, based on the resource configuration information and/or the state associated with the first UL transmission.

In an embodiment, the resource configuration information is configured to indicate at least one of the following.

The CGRT configuration is configured to indicate whether the CGRT is configured therein, and the automatic transmission configuration is configured to indicate whether the automatic transmission is configured therein.

When the resource configuration information indicates whether the CGRT is configured therein, the CGRT configuration may be configured to indicate information of whether the CGRT is configured therein. Correspondingly, when the resource configuration information indicates whether the automatic transmission is configured therein, the automatic transmission configuration may be configured to indicate information of whether the automatic transmission is configured therein.

In an embodiment, the state associated with the first UL transmission includes at least one of 1)-10) in the following.

1) whether the LBT failure indication corresponding to the first UL transmission is acquired. In a process of the first UL transmission, when the terminal device fails to perform the LBT, the physical layer of the terminal device reports the LBT failure indication to an upper layer (e.g., the MAC layer). Conversely, when the terminal device successfully performs the LBT, no LBT failure indication is reported. Therefore, the state associated with the first UL transmission includes whether the LBT failure indication corresponding to the first UL transmission is acquired.

2) whether the conflict indication is acquired. In the process of the first UL transmission, when the first resource has the resource conflict with other resources, the physical layer of the terminal device may report the conflict indication to the upper layer (e.g., the MAC layer). Conversely, when the first resource has no conflict with other resources, no conflict indication is reported. Therefore, the state associated with the first UL transmission includes whether the conflict indication corresponding to the first UL transmission is acquired.

3) whether the DFI is acquired. In the process of the first UL transmission, when the terminal device successfully performs the LBT and performs the UL transmission on the first resource, the terminal device may receive the DFI returned by the network-side device. The ACK/NACK is configured to indicate whether the DFI is successfully received on the first resource. Therefore, the state associated with the first UL transmission includes whether the DFI is acquired.

4) whether the first UL transmission is determined to be uncompleted. In the process of the first UL transmission, when the terminal device fails in the transmission (e.g., determining the low priority, acquiring the LBT failure indication, acquiring the conflict indication, or acquiring the DFI indicating the NACK), the terminal device may determine the first UL transmission is uncompleted. In an embodiment, during implementation, for example, the terminal device may configure the first UL transmission with an identifier indicating the transmission is uncompleted. Therefore, the state associated with the first UL transmission includes whether the first UL transmission is determined to be uncompleted.

5) whether the first resource is determined to be the low-priority resource, the conflicting resource, or the cancelled resource. For example, in the process of the first UL transmission, when the first resource has the resource conflict with other resources and the first resource fails to perform the LBT or the UL transmission due to the resource conflict, the terminal device may determine the first resource to be the low-priority resource, the conflicting resource, or the cancelled resource. For example, the terminal device may configure the first resource with a low-priority/conflicting/cancelled identifier. Therefore, the state associated with the first UL transmission includes whether the first resource is determined to be the low-priority resource, the conflicting resource, or the cancelled resource.

6) whether the first resource is determined to be a high-priority resource. For example, in the process of the first UL transmission, when the first resource has the resource conflict with other resources and the first resource has the highest priority, the terminal device may determine the first resource to be the high-priority resource. For example, the terminal device may configure the first resource with a high-priority identifier. Therefore, the state associated with the first UL transmission includes whether the first resource is determined to be the high-priority resource.

7) whether the CGT is running. For example, for the first UL transmission or the second UL transmission or a corresponding HARQ process, the terminal device may determine whether to start the CGT, and/or, to stop running the CGT, based on at least one of an LBT situation, a resource conflict situation, and a DFI indication situation. Therefore, the state associated with the first UL transmission includes whether the CGT is running.

8) whether the CGRT is running. For example, for the first UL transmission or the second UL transmission or the corresponding HARQ process, the terminal device may determine whether to start the CGRT, and/or, to stop running the CGRT, based on at least one of the LBT situation, the resource conflict situation, and the DFI indication situation. Therefore, the state associated with the first UL transmission includes whether the CGRT is running.

9) A status of a HARQ process is pending or not pending. For example, for the first UL transmission or the second UL transmission or the corresponding HARQ process, the terminal device may determine whether to pend the HARQ process based on at least one of the LBT situation, the resource conflict situation, and the DFI indication situation. Therefore, the state associated with the first UL transmission includes the status of the HARQ process being pending or not pending.

10) whether a timing duration of the CGT is equal to a timing duration of the CGRT.

In an embodiment, processing manners may include at least one of the following behaviors 1)-19).

1) performing the automatic transmission. Performing the automatic transmission herein indicates that the automatic transmission is performed on the second resource for the MAC PDU failing to be transmitted on the first resource. That is, in a process of the second UL transmission, the automatic transmission is performed for the MAC PDU corresponding to the first resource, or the MAC PDU is retransmitted. For example, when the automatic transmission configuration indicates that automatic transmission is configured therein and the first UL transmission is determined to be uncompleted, the first behavior includes performing the automatic transmission.

2) determining the first UL transmission is uncompleted. It may be determined whether the first UL transmission is completed based on the resource configuration information and/or the state associated with the first UL transmission. That is, an operation of determining whether the first UL transmission is completed may be performed during the first UL transmission, or after the first UL transmission, or during determining the state associated with the first UL transmission, or during the second UL transmission being available, or during the second UL transmission, or during the second resource being in use. For example, when the state associated with the first UL transmission includes acquiring the LBT failure indication, the conflict indication, or the DFI indicating the NACK, which correspond to the first UL transmission, the first behavior includes determining that the first UL transmission is uncompleted.

3) determining the first UL transmission is completed. It may be determined whether the first UL transmission is completed based on the resource configuration information and/or the state associated with the first UL transmission. That is, the operation of determining whether the first UL transmission is completed may be performed during the first UL transmission, or after the first UL transmission, or during determining the state associated with the first UL transmission, or during the second UL transmission being available, or during the second UL transmission, or during the second resource being in use. For example, when the state associated with the first UL transmission includes acquiring the DFI indicating the ACK, the first behavior includes determining that the first UL transmission is completed.

4) determining the first resource is the low-priority resource. It may be determined whether the first resource is the low-priority resource based on the resource configuration information and/or the state associated with the first UL transmission. That is, an operation of determining whether the first UL transmission is the low-priority resource may be performed during the first UL transmission, or after the first UL transmission, or during determining the state associated with the first UL transmission, or during the second UL transmission being available, or during the second UL transmission, or during the second resource being in use. For example, when the state associated with the first UL transmission includes acquiring the conflict indication, the first behavior includes determining the first resource is the low-priority resource.

5) determining that the MAC PDU has been acquired. It may be determined whether the MAC PDU has been acquired based on the resource configuration information and/or the state associated with the first UL transmission. That is, an operation of determining whether the MAC PDU has been acquired may be performed during the first UL transmission, or after the first UL transmission, or during determining the state associated with the first UL transmission, or during the second UL transmission being available, or during the second UL transmission, or during the second resource being in use. For example, when the state associated with the first UL transmission includes determining the first UL transmission is uncompleted, the automatic transmission configuration indicating that the automatic transmission is configured therein, and the CGRT configuration indicating that no CGRT is configured therein, the first behavior includes determining that the MAC PDU has been acquired.

6) requiring no new MAC PDU to be acquired from a multiplexed packetized unit. In response to arrival of the second resource, the terminal device may determine whether it is required to acquire the new MAC PDU employed in a current transmission from the multiplexed packetized unit based on the resource configuration information and/or the state associated with the first UL transmission. That is, an operation of determining whether it is required to acquire the new MAC PDU employed in the current transmission from the multiplexed packetized unit may be performed during the first UL transmission, or after the first UL transmission, or during determining the state associated with the first UL transmission, or during the second UL transmission being available, or during the second UL transmission, or during the second resource being in use. For example, when the state associated with the first UL transmission includes determining the first UL transmission is uncompleted and the automatic transmission configuration indicating that the automatic transmission is configured therein, and the CGRT configuration indicating that no CGRT is configured therein, the first behavior includes requiring no new MAC PDU to be acquired from the multiplexed packetized unit.

In an embodiment, the multiplexed packetized unit may be a multiplexed/de-multiplexed functional unit in the MAC layer.

7) performing the new transmission. When the second resource is available, or the second resource arrives, or the second resource is in use, the terminal device may determine whether to perform the UL transmission on the second resource according to a manner of the new transmission, based on the resource configuration information and/or the state associated with the first UL transmission. The new transmission herein may indicate a new transmission in the automatic transmission (i.e, performing the new transmission for the MAC PDU in the first UL transmission), or may also indicate to acquire the new MAC PDU to perform the new transmission. For example, when the state associated with the first UL includes determining the first UL transmission is completed, the first behavior includes performing the new transmission (i.e., acquiring the new MAC PDU to perform the new transmission). For another example, when the state associated with the first UL transmission includes determining the first UL transmission is uncompleted, the first behavior includes performing the new transmission (i.e., performing the new transmission for the MAC PDU in the first UL transmission).

8) performing the automatic retransmission. When the second resource is available, or the second resource arrives, or the second resource is in use, the terminal device may determine whether to perform the UL transmission according to a manner of the automatic retransmission, i.e., whether to retransmit the MAC PDU in the first UL transmission, based on the resource configuration information and/or the state associated with the first UL transmission. For example, when the state associated with the first UL transmission includes determining the first UL transmission is completed and/or the CGRT indicating the CGRT is configured therein, the first behavior includes performing the automatic retransmission.

9) stopping the CGT. It may be determined whether the first UL transmission is completed based on the resource configuration information and/or the state associated with the first UL transmission. That is, the operation of determining whether the first UL transmission is completed may be performed during the first UL transmission, or after the first UL transmission, or during determining the state associated with the first UL transmission, or during the second UL transmission being available, or during the second UL transmission, or during the second resource being in use. For example, when the state associated with the first UL transmission includes determining the first UL transmission is completed, the first behavior includes stopping the CGT.

10) stopping the CGRT. It may be determined whether the first UL transmission is completed based on the resource configuration information and/or the state associated with the first UL transmission. That is, the operation of determining whether the first UL transmission is completed may be performed during the first UL transmission, or after the first UL transmission, or during determining the state associated with the first UL transmission, or during the second UL transmission being available, or during the second UL transmission, or during the second resource being in use. For example, when the state associated with the first UL transmission includes determining the first UL transmission is completed, the first behavior includes stopping the CGRT.

11) stopping the CGRT in a case of stopping the CGT. It may be determined whether the first UL transmission is completed based on the resource configuration information and/or the state associated with the first UL transmission. That is, the operation of determining whether the first UL transmission is completed may be performed during the first UL transmission, or after the first UL transmission, or during determining the state associated with the first UL transmission, or during the second UL transmission being available, or during the second UL transmission, or during the second resource being in use. For example, when the CGRT configuration indicates the CGRT is configured therein, the first behavior includes stopping the CGRT in the case of stopping the CGT.

12) stopping both the CGT and the CGRT. It may be determined whether the first UL transmission is completed based on the resource configuration information and/or the state associated with the first UL transmission. That is, the operation of determining whether the first UL transmission is completed may be performed during the first UL transmission, or after the first UL transmission, or during determining the state associated with the first UL transmission, or during the second UL transmission being available, or during the second UL transmission, or during the second resource being in use. For example, when the state associated with the first UL transmission includes determining the first UL transmission is completed, the first behavior includes stopping both the CGRT and the CGT.

13) keeping the CGT running. it may be determined whether the first UL transmission is completed based on the resource configuration information and/or the state associated with the first UL transmission. That is, the operation of determining whether the first UL transmission is completed may be performed during the first UL transmission, or after the first UL transmission, or during determining the state associated with the first UL transmission, or during the second UL transmission being available, or during the second UL transmission, or during the second resource being in use. For example, when the state associated with the first UL transmission includes determining the first UL transmission is uncompleted, the first behavior includes keeping the CGT running.

14) determining the status of the HARQ process state is not pending. It may be determined whether the first UL transmission is completed based on the resource configuration information and/or the state associated with the first UL transmission. That is, the operation of determining whether the first UL transmission is completed may be performed during the first UL transmission, or after the first UL transmission, or during determining the state associated with the first UL transmission, or during the second UL transmission being available, or during the second UL transmission, or during the second resource being in use. For example, when the state associated with the first UL transmission includes acquiring the DFI indicating the NACK, the first behavior includes determining the status of the HARQ process state is not pending.

15) determining the status of the HARQ process state is pending. It may be determined whether the first UL transmission is completed based on the resource configuration information and/or the state associated with the first UL transmission. That is, the operation of determining whether the first UL transmission is completed may be performed during the first UL transmission, or after the first UL transmission, or during determining the state associated with the first UL transmission, or during the second UL transmission being available, or during the second UL transmission, or during the second resource being in use. For example, when the state associated with the first UL transmission includes the LBT failure indication or the conflict indication, the first behavior includes determining the status of the HARQ process state is pending.

16) abandoning the MAC PDU with an uncompleted transmission. When the second resource is available, or the second resource arrives, or the second resource is in use, the terminal device may determine whether to abandon the MAC PDU with the uncompleted transmission based on the resource configuration information and/or the state associated with the first UL transmission, so as to perform the UL transmission on the second resource according to a manner of the packetized new transmission. For example, when the automatic transmission configuration indicates no automatic transmission is configured therein, the first behavior includes abandoning the MAC PDU with the uncompleted transmission.

17) transmitting according to a retransmission. When the second resource is available, or the second resource arrives, or the second resource is in use, the terminal device may determine whether to transmit according to the retransmission based on the resource configuration information and/or the state associated with the first UL transmission.

18) not emptying a HARQ buffer. When the second resource is available, or the second resource arrives, or the second resource is in use, the terminal device may determine whether to empty the HARQ buffer based on the resource configuration information and/or the state associated with the first UL transmission.

19) determining that a New Data Indication (NDI) has no flip. When the second resource is available, or the second resource arrives, or the second resource is in use, the terminal device may determine whether to determine that the NDI has a flip based on the resource configuration information and/or the state associated with the first UL transmission.

In some embodiments of the present disclosure, the resource configuration information described above is the resource configuration information of the first resource; or the resource configuration information described above may also be the resource configuration information of the second resource.

In an embodiment, when the resource configuration information of the first resource is consistent with the resource configuration information of the second resource, the terminal device is configured to determine the first behavior corresponding to the second UL transmission based on the resource configuration information and/or the state associated with the first UL transmission.

In some embodiments of the present disclosure, the UL transmission involves the automatic transmission and the automatic retransmission, which are configured to transmit the MAC PDU failing to be transmitted previously. The resource configuration information of the resource employed in a current UL transmission may be inconsistent with that of the resource employed in a previous transmission. Considering this case, an embodiment of the present disclosure provides a solution where the terminal device may detect whether the resource configuration information of the resource corresponding to the current UL transmission is consistent with that of a previous resource (e.g., an available CG resource in a next transmission). In response to a consistent result, the terminal device is configured to perform the operation S303 above. In an embodiment, in response to an inconsistent result, the terminal is configured not to perform the operation S303 above.

In an embodiment, the operation S303 (i.e., the terminal device determining the first behavior corresponding to the second UL transmission based on the resource configuration information and/or the state associated with the first UL transmission) may include: in response to the resource configuration information satisfying a first condition and/or the state associated with the first UL transmission satisfying a second condition, the terminal device determining that the first behavior includes at least one of performing the automatic transmission; determining that the first UL transmission is uncompleted; determining that the first resource is the low-priority resource; determining that the MAC PDU has been acquired; requiring no new MAC PDU to be acquired from the multiplexed packetized unit; and performing the new transmission.

The first condition includes the CGRT configuration indicating that no CGRT is configured therein and the automatic transmission configuration indicating that the automatic transmission is configured therein.

The second condition includes at least one of acquiring the LBT failure indication corresponding to the first UL transmission; the first UL transmission being determined to be uncompleted; and the first resource being determined to be the low-priority resource.

In an embodiment, in response to the terminal receiving the LBT failure indication corresponding to the first UL transmission while performing the first UL transmission, the terminal may configure the first UL transmission to be uncompleted, and/or configure the first resource to be the low-priority resource, so as to determine the first behavior during the second UL transmission.

In an embodiment, the method may further include the terminal device receiving a first indication. The first indication is configured to instruct the terminal device to process the MAC PDU or a resource corresponding to a LBT failure according to the automatic transmission.

In an embodiment, in a case of the terminal device receiving the first indication, the terminal device is configured to perform the operation of determining the first behavior in response to the resource configuration information satisfying the first condition and/or the state associated with the first UL transmission satisfying the second condition.

In an embodiment, the operation S303 may include: in response to the resource configuration information satisfying a third condition and/or the state associated with the first UL transmission satisfying a fourth condition, the terminal device determining that the first behavior includes at least one of stopping the CGT; performing the automatic retransmission, or determining that the first UL transmission is uncompleted; performing the new transmission (e.g., the packetized new transmission, or, determining that the first UL transmission is completed; performing the new transmission (e.g., performing the new transmission for the MAC PDU corresponding to the first UL transmission), or, determining that the MAC PDU has been acquired, or, requiring no new MAC PDU to be acquired from the multiplexed packetized unit; not emptying the HARQ buffer; determining that the NDI has no flip; and performing the retransmission.

In an embodiment, the third condition includes the CGRT configuration indicating that no CGRT is configured therein and the automatic transmission configuration indicating that no automatic transmission is configured therein.

The fourth condition includes at least one of the DFI indicating the NACK and corresponding to the first UL transmission being acquired; the first UL transmission being determined to be uncompleted; the CGT not running; and the first resource being determined to be the low-priority resource.

In an embodiment, in response to the terminal acquiring the DFI indicating the NACK while performing the first UL transmission, the terminal may configure the first UL transmission to be uncompleted, and/or configure the first resource to be the low-priority resource, so as to determine the first behavior during the second UL transmission.

In an embodiment, the method further includes the terminal device receiving a second indication. The second indication is configured to instruct the terminal device to process the MAC PDU or a resource corresponding to the DFI indicating the NACK according to the automatic transmission.

In an embodiment, in a case of the terminal device receiving the second indication, the terminal device is configured to perform the operation of determining the first behavior in response to the resource configuration information satisfying the third condition and/or the state associated with the first UL transmission satisfying the fourth condition.

In an embodiment, the operation S303 may include: in response to the resource configuration information satisfying a fifth condition and/or the state associated with the first UL transmission satisfying a sixth condition, the terminal device determining that the first behavior includes at least one of stopping the CGT; and performing the new transmission, or, determining that the first UL transmission is completed.

In an embodiment, the fifth condition includes the CGRT configuration indicating that no CGRT is configured therein, and the automatic transmission configuration indicating that no automatic transmission is configured therein.

The sixth condition includes at least one of the DFI configured to indicate the ACK, and corresponding to the first UL transmission being acquired; the first UL transmission being determined to be completed; the first resource being determined to be the high-priority resource; and the CGT not running.

In an embodiment, in response to the terminal device acquiring the DFI indicating the ACK while performing the first UL transmission, the terminal may configure the first UL transmission to be completed, and/or configure the first resource to be the high-priority resource, so as to determine the first behavior during the second UL transmission.

In an embodiment, the operation S303 may include: in response to the resource configuration information satisfying a seventh condition and/or the state associated with the first UL transmission satisfying an eighth condition, the terminal device determining that the first behavior includes at least one of stopping the CGT; performing the automatic transmission; determining that the first UL transmission is uncompleted; determining that the first resource is the low-priority resource; determining that the MAC PDU has been acquired; requiring no new MAC PDU to be acquired from the multiplexed packetized unit; and performing the new transmission.

In an embodiment, the seventh condition includes the CGRT configuration indicating that no CGRT is configured therein and the automatic transmission configuration indicating that the automatic transmission is configured therein.

The eighth condition includes at least one of the DFI indicating the NACK and corresponding to the first UL transmission being acquired; the first UL transmission being determined to be uncompleted; the first resource being determined to be the low-priority resource; and the CGT not running.

In an embodiment, the method further includes the terminal device receiving a third indication. The third indication is configured to instruct the terminal device to process the MAC PDU or the resource corresponding to the DFI indicating the NACK according to the automatic transmission.

In a case of the terminal device receiving the third indication, the terminal device is configured to perform the operation of determining the first behavior in response to the resource configuration information satisfying the seventh condition and/or the state associated with the first UL transmission satisfying the eighth condition.

In an embodiment, the operation S303 includes: in response to the resource configuration information satisfying a ninth condition and/or the state associated with the first UL transmission satisfying a tenth condition, the terminal device determining that the first behavior includes at least one of stopping the CGT; and determining that the first UL transmission is completed.

In an embodiment, the ninth condition includes the CGRT configuration indicating that no CGRT is configured therein, and the automatic transmission configuration indicating that the automatic transmission is configured therein.

The tenth condition includes at least one of the DFI indicating the ACK and corresponding to the first UL transmission being acquired; the first UL transmission being determined to be completed; the first resource being determined to be the high-priority resource; and the CGT not running.

In an embodiment, the operation S303 includes: in response to the resource configuration information satisfying an eleventh condition and/or the state associated with the first UL transmission satisfying a twelfth condition, the terminal device determining that the first behavior includes at least one of stopping the CGT; stopping the CGRT in the case of stopping the CGT, or, stopping both the CGT and the CGRT; determining that the status of the HARQ process is not pending; determining that the MAC PDU has been acquired; requiring no new MAC PDU to be acquired from the multiplexed packetized unit; and performing the new transmission.

In an embodiment, the eleventh condition includes the CGRT configuration indicating that the CGRT is configured therein and the automatic transmission configuration indicating that the automatic transmission is configured therein.

The twelfth condition includes at least one of the first resource being determined to be the low-priority resource, the conflicting resource, or the cancelled resource; the CGT not running; the CGRT not running; and the status of the HARQ process being not pending.

In an embodiment, the twelfth condition further includes at least one of a priority based on a logical channel being configured therein; acquiring the conflict indication corresponding to the first UL transmission; and failing to acquire the LBT failure indication corresponding to the first UL transmission.

In an embodiment, the method further includes the terminal device receiving a fourth indication. The fourth indication is configured to instruct the terminal device to process the low-priority MAC PDU or the low-priority resource according to the automatic transmission.

In a case of the terminal device receiving the fourth indication, the terminal device is configured to perform the operation of determining the first behavior in response to the resource configuration information satisfying the eleventh condition and/or the state associated with the first UL transmission satisfying the twelfth condition.

In an embodiment, the operation S303 includes: in response to the resource configuration information satisfying a thirteenth condition and/or the state associated with the first UL transmission satisfying a fourteenth condition, the terminal device determining that the first behavior includes at least one of stopping the CGT; stopping the CGRT; determining the status of the HARQ process is pending; and performing the automatic retransmission for the first UL transmission.

Alternatively, the terminal device determines that the first behavior includes at least one of keeping the CGT running; stopping the CGRT; determining the status of the HARQ process is pending or not pending; and performing the automatic retransmission for the first UL transmission.

In an embodiment, the thirteenth condition includes the CGRT configuration indicating that the CGRT is configured therein and the automatic transmission configuration indicating that no automatic transmission is configured therein.

The fourteenth condition includes at least one of the first resource being the low-priority resource, the conflicting resource, or the cancelled resource; the CGT not running; the CGRT not running; and the status of the HARQ process being pending or not pending.

In an embodiment, the fourteenth condition further includes at least one of the priority based on the logical channel being configured therein; acquiring the conflict indication corresponding to the first UL transmission; and failing to acquire the LBT failure indication corresponding to the first UL transmission.

In an embodiment, the method further includes the terminal device receiving a fifth indication. The fifth indication is configured to instruct the terminal device to process the low-priority MAC PDU or the low-priority resource according to the automatic transmission.

In a case of the terminal device receiving the fifth indication, the terminal device is configured to perform the operation of determining the first behavior in response to the resource configuration information satisfying the thirteenth condition and/or the state associated with the first UL transmission satisfying the fourteenth condition.

In an embodiment, the network-side device may instruct the terminal device whether to determine a processing manner for the second UL transmission according to a specified condition through indication information. For example, when the network-side device instructs the terminal device to process the MAC PDU or the resource having the LBT failure according to the automatic transmission, the terminal device may perform an operation of determining the first behavior described above according to the specified condition.

In an embodiment, the first indication, the second indication, the third indication, the fourth indication, or the fifth indication may be instructed to the terminal device by the network-side device (e.g., the base station) when the terminal device is accessed. Alternatively, the first indication, the second indication, the third indication, the fourth indication, or the fifth indication may be instructed to the terminal device by the network-side device when the network-side device allocates the DG resource or the CG resource, such as allocating the first resource and/or the second resource.

In an operation S304, the method includes the terminal device performing the second UL transmission on the second resource according to the first behavior.

In an embodiment, in response to the first behavior in the second UL transmission including performing the automatic transmission, the automatic transmission is performed on the second resource for the packetized MAC PDU when an identifier of a HARQ process of the second resource is the same as an identifier of a HARQ process of the packetized MAC PDU. The packetized MAC PDU is acquired during performing the first UL transmission on the first resource.

In an embodiment, the MAC PDU acquired during performing the first UL transmission on the first resource may be the new MAC PDU acquired from the multiplexed packetized unit during performing the first UL transmission on the first resource, or may also be the MAC PDU failing to be transmitted on the CG resource or the DG resource prior to the first resource.

In an embodiment, when a HARQ process of a resource employed in the current transmission is the same as a HARQ process of the packetized MAC PDU on the first resource, i.e., the resource employed in the current transmission and the packetized MAC PDU on the first resource have the same HARQ process numbers, the terminal determines that a condition for performing the automatic transmission is satisfied and performs the automatic transmission for the packetized MAC PDU on the second resource.

In an embodiment, when the identifier of the HARQ process of the second resource is the same as the identifier of the HARQ process of the packetized MAC PDU, and the second resource is configured with the automatic transmission or the automatic retransmission, the automatic transmission is performed for the packetized MAC PDU on the second resource.

In an embodiment, when the HARQ process of the resource employed in the current transmission is the same as the HARQ process of the packetized MAC PDU on the first resource, i.e., the resource employed in the current transmission and the packetized MAC PDU on the first resource have the same HARQ process numbers, the terminal may further determine whether a current resource is configured with the automatic transmission or the automatic retransmission. When the current resource is configured with the automatic transmission or the automatic retransmission, the terminal determines that the condition for performing the automatic transmission is satisfied and performs the automatic transmission for the packetized MAC PDU on the second resource.

In an embodiment, when the identifier of the HARQ process of the second resource is the same as the identifier of the HARQ process of the packetized MAC PDU, and the second resource is not configured with the automatic transmission or the automatic retransmission, the packetized MAC PDU is abandoned, or the automatic transmission is performed for the packetized MAC PDU through resources corresponding to other HARQ processes which are not unoccupied.

The other HARQ processes have identifiers different from the identifier of the HARQ process of the second resource.

In an embodiment, when the HARQ process of the resource employed in the current transmission is the same as the HARQ process of the packetized MAC PDU on the first resource, i.e., the resource employed in the current transmission and the packetized MAC PDU on the first resource have the same HARQ process numbers, the terminal may further determine whether the current resource is configured with the automatic transmission or the automatic retransmission. When the current resource is not configured with the automatic transmission or the automatic retransmission, the terminal determines that the condition for performing the automatic transmission is not satisfied, and may choose to abandon the MAC PDU or transmit the MAC PDU through the resources corresponding to the other HARQ processes which are not unoccupied.

In an embodiment, when the automatic transmission is performed for the packetized MAC PDU through the resources corresponding to the other HARQ processes which are not occupied, Uplink Control Information (UCI) is transmitted through a resource other than the second resource. The UCI includes a selected one from the other HARQ processes.

In some embodiments, when the terminal device chooses the resources corresponding to the other HARQ processes which are not occupied to transmit the MAC PDU, the terminal device further informs the network-side device of information of the selected one of the other HARQ processes through the UCI on other resources. The other resources may be CG/DG resources, or may also be other types of resources other than the CG/DG resources.

In an embodiment, the other resources described above may be resources having the same time domain with the second resource and a different frequency domain from the second resource, or may be resources after the second resource.

A case where the terminal device determines the processing manner of the UL transmission on the current resource based on resource configuration information of the current resource and a state associated with the previous UL transmission, is taken as an example in the following embodiments.

As shown in FIG. 4, FIG. 4 is a schematic view of the UL transmission method according to an embodiment of the present disclosure. In an embodiment, when a condition A is satisfied, the UE performs a corresponding behavior a for a resource having the LBT failure or a resource having the LBT failure indication but the MAC PDU thereof having been packetized. The condition A may include at least one of: operating in the shared band, configured with no CGRT therein, configured with autonomousTX therein, receiving the LBT failure indication from a bottom layer during the previous transmission on the CG/DG resource, and receiving the first indication. The behavior a may include at least one of: performing the autonomousTX, determining that the previous transmission is uncompleted, determining a resource employed in the previous transmission to be a low-priority resource, determining that the MAC PDU has been acquired, requiring no new MAC PDU to be acquired from the multiplexed packetized unit, and performing a new transmission.

As shown in FIG. 4, the above process is implemented as follows.

In an operation S401, the gNB allocates a resource to the UE.

The resource may be the DG, CG, etc. The resource configuration information may include the autonomousTX being configured and no CGRT being configured therein.

In an operation S402, the UE performs the transmission through the resource allocated by the gNB.

In an operation S403, the UE performs the behavior a for the resource having the LBT failure or the resource having the LBT failure indication but the MAC PDU thereof having been packetized, in response to satisfying the condition A.

For example, when the UE packetizes a MAC PDU for a CG resource, while the MAC layer receives the LBT failure indication from the bottom layer, the UE may configure the CG resource to be the low-priority resource and determine that the transmission is performed but uncompleted. When a next available CG resource has the same HARQ process with the HARQ process of the MAC PDU and the next CG is configured with autonomousTX therein, the automatic transmission is performed, and it is determined that the MAC PDU is acquired and no new MAC PDU is required to be acquired from the multiplexed packetized unit.

For another example, when the UE packetizes the MAC PDU for the CG resource, while the MAC layer receives the LBT failure indication from the bottom layer, the UE may configure the CG resource to be the low-priority resource and determine that the transmission is performed but uncompleted. When the next available CG resource has the same HARQ process with the HARQ process of the MAC PDU and the next CG is configured with no autonomousTX therein, the UE acquires the new MAC PDU from the multiplexed packetized unit and performs the new transmission.

For a yet example, when the UE packetizes the MAC PDU for the CG resource, while the MAC layer receives the LBT failure indication from the bottom layer, the UE may configure the CG resource to be the low-priority resource and determine that the transmission is performed but uncompleted. When the next available CG resource has the same HARQ process with the HARQ process of the MAC PDU and the next CG resource is configured with no autonomousTX therein, the UE acquires the new MAC PDU from the multiplexed packetized unit and moves the un-transmitted MAC PDU to other HARQ processes.

The solution shown in FIG. 4 provides a method of the UE performing the automatic transmission or the new transmission due to a transmission failure caused by an UL LBT failure.

As shown in FIG. 5, FIG. 5 is a schematic view of another UL transmission method according to an embodiment of the present disclosure. When a condition B is satisfied, the UE performs a behavior b while receiving the DFI. The condition B may include at least one of: operating in the shared band, being configured with no CGRT therein, being configured with no autonomousTX therein, and receiving the second indication. The behavior b may include at least one of: stopping the CGT, determining to perform the retransmission or determining that the previous transmission is uncompleted (in a case of DFI=NACK), and determining to perform the new transmission or determining that the previous transmission is completed (in a case of DFI=ACK, or a case of DFI=NACK).

As shown in FIG. 5, the above process may be implemented as follows.

In an operation S501, the gNB allocates the resource to the UE.

The resource may be the DG, CG, etc. The resource configuration information may include no autonomousTX being configured and no CGRT being configured therein.

In an operation S502, the UE performs the transmission through the resource allocated by the gNB.

In an operation S503, when the condition B is satisfied, the UE performs the behavior b while receiving the DFI.

For example, when the UE packetizes the MAC PDU for the CG resource, while the MAC layer receives the DFI indication of the gNB and the DFI is the ACK, the UE stops the CGT and determines that the transmission is successful.

For another example, when the UE packetizes the MAC PDU for the CG resource, while the MAC layer receives the DFI indication of the gNB and the DFI is the NACK, the UE stops the CGT. Further, it may be determined that the transmission is uncompleted or failed.

For a yet example, when the UE packetizes the MAC PDU for the CG resource, while the MAC layer receives the DFI indication of the gNB, and the DFI is the NACK, the UE stops the CGT and determines that the transmission is failed or uncompleted. When the next available CG resource arrives, it is determined that the MAC PDU is acquired and no new MAC PDU is required to be acquired from the multiplexed packetized unit.

The solution shown in FIG. 5 provides a method of the UE processing a case of the UL LBT failing and no autonomousTX being configured therein, in response to the UE receiving the DFI.

As shown in FIG. 6, FIG. 6 is a schematic view of another UL transmission method according to an embodiment of the present disclosure. When a condition C is satisfied, the UE performs a behavior c while receiving the DFI. The condition C may include at least one of: operating in the shared band, being configured with no CGRT therein, being configured with the autonomousTX therein, and receiving the third indication. The behavior c may include at least one of: stopping the CGT and/or determining that the previous transmission is completed in response to the DFI being the ACK, stopping the CGT in response to the DFI being the NACK, performing the autonomousTX, determining that the previous transmission is uncompleted, determining the previous resource is the low-priority resource, determining that the MAC PDU is acquired, requiring no MAC PDU to be acquired from the multiplexed packetized unit, and performing the new transmission.

As shown in FIG. 6, the above process may be implemented as follows.

In an operation S601, the gNB allocates the resource to the UE.

The resource may be the DG, CG, etc. The resource configuration information may include the autonomousTX being configured and no CGRT being configured therein.

In an operation S602, the UE performs the transmission through the resource allocated by the gNB.

In an operation S603, when the condition C is satisfied, the UE performs the behavior c while receiving the DFI.

For example, when the UE packetizes the MAC PDU for the CG resource, while the MAC layer receives the DFI indication of the gNB and the DFI is the ACK, the UE stops the CGT and determines that the transmission is successful or completed.

For another example, when the UE packetizes the MAC PDU for the CG resource, while the MAC layer receives the DFI indication of the gNB and the DFI is the NACK, the UE stops the CGT, performs the autonomousTX on the next available CG resource, and determines that the transmission is uncompleted and the resource is the low-priority resource. When the next available CG resource has the same HARQ process with the HARQ process of the MAC PDU and the next CG resource is configured with no autonomousTX therein, the UE determines that the MAC PDU is acquired and no new MAC PDU is required to be acquired from the multiplexed packetized unit.

The solution shown in FIG. 6 provides a method of the UE processing a case of the UL LBT failing and the autonomousTX being configured therein, in response to receiving the DFI.

As shown in FIG. 7, FIG. 7 is a schematic view of another UL transmission method according to an embodiment of the present disclosure. When a condition D is satisfied, the UE performs a behavior d for the low-priority resource or the low-priority MAC PDU. The condition D may include at least one of: operating in the shared band, being configured with the CGRT therein, being configured with the autonomousTX therein, being configured with LCH-based prioritization therein, the resource corresponding to the previous UL transmission being the low-priority resource, the conflicting resource, or the cancelled resource, receiving a conflict-permitting indication of the bottom layer in a process of the previous UL transmission, and receiving no LBT failure indication of the bottom layer in the process of the previous UL transmission. The behavior d may include at least one of: stopping the CGT, stopping the CGRT in the case of stopping the CGT, determining the status of the HARQ process is not pending, determining that the MAC PDU is acquired, determining that no MAC PDU is required to be acquired from the multiplexed packetized unit, and performing the new transmission.

As shown in FIG. 7, the above process may be implemented as follows.

In an operation S701, the gNB allocates the resource to the UE.

The resource may be the DG, CG, etc. The resource configuration information may include both the autonomousTX and the CGRT being configured therein.

In an operation S702, the UE performs the transmission through the resource allocated by the gNB.

In an operation S703, when the condition D is satisfied, the UE performs the behavior d for the low-priority resource or the low-priority MAC PDU.

For example, the UE packetizes the MAC PDU for the CG resource. However, the transmission of the low-priority MAC PDU fails to be completed due to the resource conflict. In this case, the MAC layer is configured to stop the CGRT in the case of stopping the CGT, and determines that the status of the HARQ process is not pending. When a subsequent CG resource is available and is configured with both the CGRT and the autonomousTX, it is determined that the MAC PDU is acquired and no MAC PDU is required to be acquired from the multiplexed packetized unit, and the new transmission is performed.

The solution shown in FIG. 7 provides a method of the UE performing the automatic transmission by means of the autonomousTX when the MAC PDU fails to be transmitted duo to the low priority thereof and both the CGRT and the autonomousTX are configured therein.

As shown in FIG. 8, FIG. 8 is a schematic view of another UL transmission method according to an embodiment of the present disclosure. When a condition E is satisfied, the UE performs a behavior e or a behavior f for the low-priority resource or the low-priority MAC PDU. The condition E may include at least one of: operating in the shared band, being configured with the CGRT therein, being configured with no autonomousTX therein, being configured with the LCH-based prioritization therein, the resource corresponding to the previous UL transmission being the low-priority resource, the conflicting resource, or the cancelled resource, receiving the conflict-permitting indication of the bottom layer in the process of the previous UL transmission, and failing to receive the LBT failure indication of the bottom layer in the process of the previous UL transmission. The behavior e may include at least one of: stopping the CGT, stopping the CGRT, determining the status of the HARQ process is pending (being waiting), and applying or performing the automatic retransmission. The behavior f may include at least one of: not stopping the CGT, stopping the CGRT, determining that the status of the HARQ process is pending or not pending, and applying or performing the automatic retransmission.

As shown in FIG. 8, the above process may be implemented as follows.

In an operation S801, the gNB allocates the resource to the UE.

The resource may be the DG, CG, etc. The resource configuration information may include no autonomousTX being configured and the CGRT being configured therein.

In an operation S802, the UE performs the transmission through the resource allocated by the gNB.

In an operation S803, when the condition E is satisfied, the UE performs the behavior d or the behavior f for the low-priority resource or the low-priority MAC PDU.

For example, the UE packetizes the MAC PDU for the CG resource. The transmission of the low-priority MAC PDU fails to be completed due to the resource conflict, while a subsequent available CG resource is configured with the CGRT. In this case, the MAC layer is configured to stop both the CGT and the CGRT, determine the status of the HARQ process is pending when the subsequent available CG arrives, and apply the automatic retransmission.

For another example, the UE packetizes the MAC PDU for the CG resource. The transmission of the low-priority MAC PDU fails to be completed due to the resource conflict, while the subsequent available CG resource is configured with the CGRT. In this case, the MAC layer is configured not to stop the CGT but (alternatively) configured to stop the CGRT, determine the status of the HARQ process is pending when the subsequent available CG arrives, and apply or perform the automatic retransmission.

The solution shown in FIG. 8 provides a method of the UE performing the automatic retransmission by means of the CGRT when the MAC PDU fails to be transmitted duo to the low priority thereof.

In an embodiment, when the LBT failure indication, the conflict indication, or the DFI indicating the NACK, which corresponds to the second UL transmission, is acquired, the second UL transmission may be configured to be uncompleted, and/or, the second resource may be configured to be the low-priority resource.

In an embodiment, when the terminal acquires the LBT failure indication, the conflict indication, or the DFI indicating the NACK, which corresponds to the second UL transmission in the process of the second UL transmission, the terminal determines that the second UL transmission is failed. The second UL transmission may be configured to be uncompleted, and/or, the second resource may be configured to be the low-priority resource. In this way, when the available CG resource arrives subsequently, the terminal may determine a processing manner for a new available CG resource based on this information according to the above operations.

In an embodiment, when the DFI indicating the ACK and corresponding to the second UL transmission is acquired, the second UL transmission is configured to be completed, and/or the second resource is configured to be the high-priority resource.

Accordingly, when the terminal acquires the DFI indicating the ACK in the process of the second UL transmission, the terminal determines the second UL transmission to be successful. Consequently, the terminal may configure the second UL transmission to be completed, and/or configure the second resource to be the high-priority resource. In this way, when the available CG resource arrives subsequently, the terminal may determine the processing manner for the new available CG resource based on this information according to the above operations.

In an embodiment, the terminal may stop the CGT in response to acquiring the DFI indicating the ACK/NACK in the process of the second UL transmission.

In an embodiment, in response to determining the second resource to be the low-priority resource, the conflicting resource, or the cancelled resource in the process of the second UL transmission, the terminal may perform at least one of: stopping the CGT, stopping the CGRT, and configuring the status of the HARQ process to be pending or not pending.

In an embodiment, the above solution may also include determining the status of the HARQ process is pending in response to receiving no LBT failure indication corresponding to the second UL transmission and determining the second resource or the MAC PDU corresponding to the second resource to have the low priority, in a case of the CGT not running, the timing duration of the CGT being the same with the timing duration of the CGRT, and the automatic transmission configuration of the second resource indicating that the second resource is not configured with the automatic transmission.

Accordingly, the terminal may perform the same process in the first UL transmission. That is, the terminal device determines the status of the HARQ process is pending in response to receiving no LBT failure indication corresponding to the first UL transmission and determining the first resource or the MAC PDU corresponding to the first resource has the low priority, in a case of the CGT not running, the timing duration of the CGT being the same with the timing duration of the CGRT, and the automatic transmission configuration of the first resource indicating that the first resource is not configured with the automatic transmission.

According to the solution provides in some embodiments of the present disclosure, in a process of the terminal device performing the second UL transmission on the second resource based on the first behavior, or after the second UL transmission, when the CGT is not running, the timing duration of the CGT is the same with the timing duration of the CGRT, and the automatic transmission configuration of the second resource indicates that the second resource is not configured with the automatic transmission, the terminal device may determine the status of the HARQ process is pending in response to determining the second resource or the MAC PDU corresponding to the second resource has the low priority in a case of the LBT being successful (i.e., failing to receive the LBT failure indication). In this way, the automatic retransmission may be performed on the subsequent available CG resource or DG resource.

In an embodiment, the above solution may further include stopping the CGT (so as to perform the new transmission on the next CG/DG resource) or keeping the CGT running (so as to perform the retransmission or enter the new transmission on the next CG/DG resource) in response to determining the second resource or the MAC PDU corresponding to the second resource has the low priority, in a case of the CGT being running and the automatic transmission configuration of the second resource indicating that the second resource is configured with the automatic transmission.

Accordingly, the terminal device may perform the same process in the first UL transmission. That is, in a case of the CGT being running and the automatic transmission configuration of the first resource indicating that the first resource is configured with the automatic transmission, the terminal device may stop the CGT or keep the CGT running in response to determining the first resource or the MAC PDU corresponding to the first resource has the low priority.

In an embodiment, the above solution may further include determining the status of the HARQ process is pending or keeping the status of the HARQ process unchanged, in response to determining the second resource or the MAC PDU corresponding to the second resource has the low priority, in a case of the status of the HARQ process being pending.

In an embodiment, the above solution may further include determining the status of the HARQ process is pending or keeping the status of the HARQ process unchanged in response to determining the second resource or the MAC PDU corresponding to the second resource has the low priority, in a case of satisfying at least one of the automatic transmission configuration of the second resource indicating that the second resource is configured with the automatic transmission, the CGT not running, the CGRT not running, and failing to receive the LBT failure indication corresponding to the second UL transmission; and the status of the HARQ process being pending.

Alternatively, the status of the HARQ process is determined to be pending or is kept unchanged in response to determining the second resource or the MAC PDU corresponding to the second resource has the low priority, in a case of satisfying at least one of the automatic transmission configuration of the second resource indicating that the second resource is configured with the automatic transmission, the CGT not running, the CGRT not running, and receiving the LBT failure indication corresponding to the second UL transmission; and the status of the HARQ process being pending.

Accordingly, the terminal device may perform the same process in the first UL transmission. That is, when the status of the HARQ process is pending (in an embodiment, the automatic transmission configuration of the first resource indicates that the first resource is configured with the automatic transmission, the CGT is not running, and/or the CGRT is not running), the terminal device may determine the status of the HARQ process is pending or keep the status of the HARQ process unchanged in response to determining the first resource or the MAC PDU corresponding to the first resource has the low priority.

In an embodiment, the above solution may also include determining the status of the HARQ process is pending or keeping the status of the HARQ process unchanged in response to determining the second resource or the MAC PDU corresponding to the second resource has the low priority, in a case of the status of the HARQ process being not pending and the CGT not running.

In an embodiment, the above solution may also include determining the status of the HARQ process is pending or keeping the status of the HARQ process unchanged in response to determining the second resource or the MAC PDU corresponding to the second resource has the low priority, in a case of satisfying at least one of the automatic transmission configuration of the second resource indicating that the second resource is configured with the automatic transmission, the CGRT not running, and failing to receive the LBT failure indication corresponding to the second UL transmission; the status of the HARQ process being not pending, and the CGT not running.

Alternatively, the status of the HARQ process is determined to be pending or is kept unchanged in response to determining the second resource or the MAC PDU corresponding to the second resource has the low priority, in a case of satisfying at least one of the automatic transmission configuration of the second resource indicating that the second resource is configured with the automatic transmission, the CGRT not running, and receiving the LBT failure indication corresponding to the second UL transmission; the status of the HARQ process being not pending, and the CGT not running.

Accordingly, the terminal device may perform the same process in the first UL transmission. That is, when the status of the HARQ process is not pending (in an embodiment, the automatic transmission configuration of the first resource indicates that the first resource is configured with the automatic transmission, and/or the CGRT is not running) and the CGT not running, the status of the HARQ process is determined to be pending or is kept unchanged in response to determining the first resource or the MAC PDU corresponding to the first resource has the low priority.

In an embodiment, when the first resource is determined to be the low-priority resource, the conflicting resource, or the cancelled resource, and information that the first resource has data to be transmitted is received, or a network side receives information that the first resource has data being transmitted which is cancelled or determined to have the low priority, or the network side determines existence of the resource conflict and not configured with skipping the UL transmission, the terminal device is configured to start or restart a first timer.

The first timer is at least one of a BandWidth Partial (BWP)-Inactivity timer; and a secondary cell (sCell) Deactivation Timer.

The first resource is determined to be the low priority resource, the conflicting resource, or the cancelled resource, may be a result of a conflict between UEs. For example, the terminal device may cancel the first resource in the transmission process according to Cell-Radio Network Temporary Identifier (C-RNTI) information. Alternatively, the first resource is determined to be the low priority resource, the conflicting resource, or the cancelled resource, may also be a result of a UCI resource transmission conflict.

The network side may detect that the first resource has the data to be transmitted, or determine the existence of the resource conflict and not configured with skipping the UL transmission, or determine that the first resource has the data being transmitting which is cancelled or is determined to have the low priority, based on a signal level or a Demodulation Reference Signal (DMRS).

In an embodiment, when the first resource is determined to be the low-priority resource, the conflicting resource, or the cancelled resource, and the network side is indicated that the first resource has the data to be transmitted, or the network side is indicated that the first resource has the data being transmitted which is cancelled or determined to have the low priority, or the network side determines the existence of the resource conflict and not configured with skipping the UL transmission, the network side may also be configured to performing an operation of starting or restarting the first timer.

In conclusion, the solutions described in some embodiments of the present disclosure provide a method to perform the UL transmission on the current CG resource or the current DG resource based on different resource configuration information and the state associated with previous UL transmission, which clarifies the terminal behaviors on the DG resource or the CG resource under different cases. Consequently, it ensures that the data which has not been transmitted or the data which has not been completely transmitted to be retransmitted, such that the data loss is avoided. Alternatively, it ensures that the new data is transmitted first. In this way, the utilization rate for the DG resource or the CG resource may be improved, and thus the UL transmission efficiency on the DG resource or the CG resource of the shared band may be improved.

Apparatus embodiments of the present disclosure are described in the following and may be configured to implement method embodiments of the present disclosure. Undisclosed details in the apparatus embodiments may refer to the method embodiments.

As shown in FIG. 9, FIG. 9 is a structural schematic view of an UL transmission apparatus according to an embodiment of the present disclosure. The apparatus has functions to achieve the UL transmission method embodiments described above. The functions may be achieved by means of a hardware, or be achieved by the hardware executing a software. The apparatus may be the terminal device described above, or may be also be arranged in the terminal device. As shown in FIG. 9, the apparatus may include a transmission module 901.

The transmission module 901 is configured to perform the second UL transmission on the second resource based on the resource configuration information and/or the state associated with the first UL transmission. The resource configuration information includes at least one of the CGRT configuration and the automatic transmission configuration. The first UL transmission is performed on the first resource.

The first resource is the DG resource or the CG resource in the shared band, the second resource is the DG resource or the CG resource in the shared band, and the first resource is prior to the second resource in the time domain.

In an embodiment, the transmission module 901 may include a behavior determining submodule and a processing submodule.

The behavior determining submodule is configured to determine the first behavior corresponding to the second UL transmission based on the resource configuration information and/or the state associated with the first UL transmission.

The processing submodule is configured to perform the second UL transmission on the second resource based on the first behavior.

In an embodiment, the resource configuration information is configured to indicate at least one of the CGRT configuration being configured to indicate whether the CGRT is configured therein, and the automatic transmission configuration being configured to indicate whether the automatic transmission is configured therein.

The state associated with the first UL transmission includes at least one of: whether the LBT failure indication corresponding to the first UL transmission is acquired; whether the conflict indication corresponding to the first UL transmission is acquired; whether the DFI is acquired; whether the first UL transmission is determined to be uncompleted; whether the first resource is determined as the low-priority resource, the conflicting resource, or the cancelled resource; whether the first resource is determined as the high-priority resource; whether the CGT runs; whether the CGRT runs; whether the status of the HARQ process is pending or not pending; and whether the timing duration of the CGT is equal to the timing duration of the CGRT.

In an embodiment, the processing manner may include at least one of: performing the automatic transmission; determining that the first UL transmission is uncompleted; determining that the first UL transmission is completed; determining that the first resource as the low-priority resource; determining that the MAC PDU has been acquired; requiring no new MAC PDU to be acquired from the multiplexed packetized unit; performing the new transmission; performing the automatic retransmission for the MAC PDU with the uncompleted transmission on the first resource; stopping the CGT; stopping the CGRT; stopping the CGRT in the case of stopping the CGT; stopping both the CGT and the CGRT; keeping the CGT running; determining the status of the HARQ process is not pending; determining the status of the HARQ process status is pending; acquiring the new MAC PDU from the multiplexed packetized unit; abandoning the MAC PDU with the uncompleted transmission on the first resource; transmitting according to the retransmission; not emptying the HARQ buffer; determining that the NDI has no flip; and performing the retransmission.

In an embodiment, the behavior determining submodule is configured to determine that the first behavior includes at least one of: performing the automatic transmission; determining that the first UL transmission is uncompleted; determining that the first resource as the low-priority resource; determining that the MAC PDU has been acquired; requiring no new MAC PDU to be acquired from the multiplexed packetized unit; and performing the new transmission, in response to the resource configuration information satisfying the first condition and/or the state associated with the first UL transmission satisfying the second condition.

In an embodiment, the first condition includes the CGRT configuration indicating that no CGRT is configured therein and the automatic transmission configuration indicating that the automatic transmission is configured therein.

The second condition includes at least one of: acquiring the LBT failure indication corresponding to the first UL transmission; the first UL transmission being determined to be uncompleted; and the first resource being determined to be the low-priority resource.

In an embodiment, the transmission module is further configured to receive the first indication. The first indication is configured to instruct the terminal device to process the MAC PDU or the resource corresponding to the LBT failure according to the automatic transmission.

In an embodiment, the behavior determining submodule is configured to determine that the first behavior includes at least one of: stopping the CGT; performing the automatic retransmission, or, determining that the first UL transmission is uncompleted; performing the new transmission, or, determining that the first UL transmission is completed; performing the new transmission, or, determining that the MAC PDU has been acquired, or, requiring no new MAC PDU to be acquired from the multiplexed packetized unit; not emptying the HARQ buffer; determining that the NDI has no flip; and performing the retransmission, in response to the resource configuration information satisfying the third condition and/or the state associated with the first UL transmission satisfying the fourth condition.

In an embodiment, the third condition includes the CGRT configuration indicating that no CGRT is configured therein and the automatic transmission configuration indicating that no automatic transmission is configured therein.

The fourth condition includes at least one of: the DFI indicating the NACK and corresponding to the first UL transmission being acquired; the first UL transmission being determined to be uncompleted; the CGT not running; and the first resource being determined to be the low-priority resource.

In an embodiment, the transmission module is further configured to receive the second indication. The second indication is configured to instruct the terminal device to process the MAC PDU or the resource corresponding to the DFI indicating the NACK according to the automatic transmission.

In an embodiment, the behavior determining submodule is configured to determine that the first behavior includes at least one of: stopping the CGT; and performing the new transmission, or, determining that the first UL transmission is completed, in response to the resource configuration information satisfying the fifth condition and/or the state associated with the first UL transmission satisfying the sixth condition.

In an embodiment, the fifth condition includes the CGRT configuration indicating that no CGRT is configured therein, and the automatic transmission configuration indicating that no automatic transmission is configured therein.

The sixth condition includes at least one of the DFI configured to indicate the ACK and corresponding to the first UL transmission being acquired; the first UL transmission being determined to be completed; the first resource being determined to be the high-priority resource; and the CGT not running.

In an embodiment, the behavior determining submodule is configured to determine that the first behavior includes at least one of: stopping the CGT; performing the automatic transmission; determining that the first UL transmission is uncompleted; determining that the first resource to be the low-priority resource; determining that the MAC PDU has been acquired; requiring no new MAC PDU to be acquired from the multiplexed packetized unit; and performing the new transmission, in response to the resource configuration information satisfying the seventh condition and/or the state associated with the first UL transmission satisfying the eighth condition.

In an embodiment, the seventh condition includes the CGRT configuration indicating that no CGRT is configured therein and the automatic transmission configuration indicating that the automatic transmission is configured therein.

The eighth condition includes at least one of: the DFI indicating the NACK and corresponding to the first UL transmission being acquired; the first UL transmission being determined to be uncompleted; the first resource being determined to be the low-priority resource; and the CGT not running.

In an embodiment, the transmission module is further configured to receive the third indication. The third indication is configured to instruct the terminal device to process the MAC PDU or the resource corresponding to the DFI indicating the NACK according to the automatic transmission.

In an embodiment, the behavior determining submodule is configured to determine that the first behavior includes at least one of: stopping a CGT; and determining that the first UL transmission is completed, in response to the resource configuration information satisfying the ninth condition and/or the state associated with the first UL transmission satisfying the tenth condition.

In an embodiment, the ninth condition includes the CGRT configuration indicating that no CGRT is configured therein, and the automatic transmission configuration indicating that an automatic transmission is configured therein.

The tenth condition includes at least one of: the DFI indicating the ACK and corresponding to the first UL transmission being acquired; the first UL transmission being determined to be completed; the first resource being determined to be the high-priority resource; and the CGT not running.

In an embodiment, the behavior determining submodule is configured to determine that the first behavior includes at least one of: stopping the CGT; stopping the CGRT in the case of stopping the CGT, or, stopping both the CGT and the CGRT; determining that the status of the HARQ process is not pending; determining that the MAC PDU has been acquired; requiring no new MAC PDU to be acquired from the multiplexed packetized unit; and performing a new transmission, in response to the resource configuration information satisfying the eleventh condition and/or the state associated with the first UL transmission satisfying the twelfth condition.

In an embodiment, the eleventh condition includes the CGRT configuration indicating that the CGRT is configured therein and the automatic transmission configuration indicating that the automatic transmission is configured therein.

In an embodiment, the twelfth condition includes at least one of: the first resource being determined to be the low-priority resource, the conflicting resource, or the cancelled resource; the CGT not running; the CGRT not running; and the status of the HARQ process being not pending.

In an embodiment, the twelfth condition may further include at least one of: the priority based on the logical channel being configured therein; acquiring the conflict indication corresponding to the first UL transmission; and failing to acquire the LBT failure indication corresponding to the first UL transmission.

In an embodiment, the transmission module is further configured to receive the fourth indication. The fourth indication is configured to instruct the terminal device to process the low-priority MAC PDU or the low-priority resource according to the automatic transmission.

In an embodiment, the behavior determining submodule is configured to determine that the first behavior includes at least one of: stopping the CGT; stopping the CGRT; determining the status of the HARQ process is pending; and performing the automatic retransmission for the first UL transmission; or determine that the first behavior includes at least one of: keeping the CGT running; stopping the CGRT; determining the status of the HARQ process is pending; determining the status of the HARQ process is not pending; and performing the automatic retransmission for the first UL transmission, in response to the resource configuration information satisfying the thirteenth condition and/or the state associated with the first UL transmission satisfying the fourteenth condition.

In an embodiment, the thirteenth condition includes the CGRT configuration indicating that the CGRT is configured therein and the automatic transmission configuration indicating that no automatic transmission is configured therein.

The fourteenth condition includes at least one of: the first resource being the low-priority resource, the conflicting resource, or the cancelled resource; the CGT not running; the CGRT not running; and the status of the HARQ process being pending or not pending.

In an embodiment, the fourteenth condition further includes at least one of: the priority based on the logical channel being configured therein; acquiring the conflict indication corresponding to the first UL transmission; and failing to acquire the LBT failure indication corresponding to the first UL transmission.

In an embodiment, the transmission module is further configured to receive the fifth indication. The fifth indication is configured to instruct the terminal device to process the low-priority MAC PDU or the low-priority resource according to the automatic retransmission.

In an embodiment, the resource configuration information includes the resource configuration information corresponding to the second resource; or the resource configuration information includes the resource configuration information corresponding to the first resource.

In an embodiment, when the first behavior includes performing the automatic transmission, the processing submodule is configured to perform the automatic transmission on the second resource for the packetized MAC PDU, in response to the identifier of the HARQ process of the second resource being the same as the identifier of the HARQ process of the packetized MAC PDU.

The packetized MAC PDU is the MAC PDU during performing the first UL transmission on the first resource.

In an embodiment, the processing submodule is configured to perform the automatic transmission for the packetized MAC PDU on the second resource, in response to the identifier of the HARQ process of the second resource being the same as the identifier of the HARQ process of the packetized MAC PDU and the second resource being configured with the automatic transmission or the automatic retransmission.

In an embodiment, the processing submodule is configured to abandon the packetized MAC PDU or perform the automatic transmission for the packetized MAC PDU through the resources corresponding to the other HARQ processes which are not unoccupied, in response to the identifier of the HARQ process of the second resource being the same as the identifier of the HARQ process of the packetized MAC PDU and the second resource being not configured with the automatic transmission or the automatic retransmission.

The other HARQ processes have the identifiers different from the identifier of the HARQ process of the second resource.

In an embodiment, the processing submodule is configured to transmit the UCI through the resource other than the second resource in response to performing the automatic transmission for the packetized MAC PDU through the resources corresponding to the other HARQ processes which are not unoccupied. The UCI includes the selected one from the other HARQ processes.

In an embodiment, the first resource and the second resource belong to the same CG resource configuration; or the first resource and the second resource belong to different CG resource configurations, respectively.

In an embodiment, the apparatus may further include a configuring module.

The configuring module is configured to configure the second UL transmission to be uncompleted, and/or, configure the second resource to be the low-priority resource, in response to acquiring the LBT failure indication, the conflict indication, or the DFI indicating the NACK, which corresponds to the second UL transmission.

In an embodiment, the configuring module is configured to determine the status of the HARQ process is pending in response to failing to receive the LBT failure indication corresponding to the second UL transmission and determining the second resource or the MAC PDU corresponding to the second resource has the low priority, in the case of the CGT not running, the timing duration of the CGT being the same with the timing duration of the CGRT, and the automatic transmission configuration of the second resource indicating that the second resource is not configured with the automatic transmission.

In an embodiment, the configuring module is configured to stop the CGT or keep the CGT running in response to determining the second resource or the MAC PDU corresponding to the second resource has the low priority, in the case of the CGT being running and the automatic transmission configuration of the second resource indicating that the second resource is configured with the automatic transmission.

In an embodiment, the configuring module is configured to determine the status of the HARQ process is pending or keeping the status of the HARQ process unchanged, in response to determining the second resource or the MAC PDU corresponding to the second resource to have the low priority, in the case of the status of the HARQ process being pending.

In an embodiment, the configuring module is configured to determine the status of the HARQ process is pending or keep the status of the HARQ process unchanged in response to determining the second resource or the MAC PDU corresponding to the second resource has the low priority, in the case of satisfying at least one of: the automatic transmission configuration of the second resource indicating that the second resource is configured with the automatic transmission; the CGT not running; the CGRT not running; and failing to receive the LBT failure indication corresponding to the second UL transmission; and the status of the HARQ process being pending.

Alternatively, the configuring module is configured to determine the status of the HARQ process is pending or keep the status of the HARQ process unchanged in response to determining the second resource or the MAC PDU corresponding to the second resource has the low priority, in the case of satisfying at least one of: the automatic transmission configuration of the second resource indicating that the second resource is configured with the automatic transmission; the CGT not running; the CGRT not running; and receiving the LBT failure indication corresponding to the second UL transmission; and the status of the HARQ process being pending.

In an embodiment, the configuring module is configured to determine the status of the HARQ process is pending or keep the status of the HARQ process unchanged in response to determining the second resource or the MAC PDU corresponding to the second resource has the low priority, in the case of the status of the HARQ process being not pending and the CGT not running.

In an embodiment, the configuring module is configured to determine the status of the HARQ process is pending or keep the status of the HARQ process unchanged in response to determining the second resource or the MAC PDU corresponding to the second resource has the low priority, in the case of satisfying at least one of: the automatic transmission configuration of the second resource indicating that the second resource is configured with the automatic transmission; the CGRT not running; and failing to receive the LBT failure indication corresponding to the second UL transmission; the status of the HARQ process being not pending, and the CGT not running.

Alternatively, the configuring module is configured to determine the status of the HARQ process is pending or keep the status of the HARQ process unchanged in response to determining the second resource or the MAC PDU corresponding to the second resource has the low priority, in the case of satisfying at least one of: the automatic transmission configuration of the second resource indicating that the second resource is configured with the automatic transmission; CGRT not running; and receiving the LBT failure indication corresponding to the second UL transmission; the status of the HARQ process being not pending, and the CGT not running.

In an embodiment, the apparatus may further include a timer management module.

The timer management module is configured to start or restart the first timer, in response to determining the first resource to be the low-priority resource, the conflicting resource, or the cancelled resource and receiving the information that the first resource has the data to be transmitted, or receiving the information that the first resource has the data being transmitted which is cancelled or determined to have the low priority, or determining the existence of the resource conflict and not configured to skip the UL transmission.

The first timer is at least one of: the BWP-Inactivity timer; and the secondary cell sCell Deactivation Timer.

In conclusion, the solutions described in some embodiments of the present disclosure provide the method to perform the UL transmission on the current CG resource or the current DG resource based on different resource configuration information and the state associated with previous UL transmission, which clarifies the terminal behaviors on the DG resource or the CG resource under different cases. Consequently, it ensures that the data which has not been transmitted or the data which has not been completely transmitted to be retransmitted, such that the data loss is avoided. Alternatively, it ensures that the new data is transmitted first. In this way, the utilization rate of the DG resource or the CG resource may be improved, and thus the UL transmission efficiency on the DG resource or the CG resource of the shared band may be improved.

It should be noted that in terms of achieving the functions of the apparatus described in the above embodiments, it is only depicted with a division of each functional module above as an example. In actual applications, the above functions may be assigned to different functional modules according to actual needs. That is, a content structure of the apparatus is divided into different functional modules to accomplish all or a part of the functions described above.

For the apparatus described in the above embodiments, a specific manner of each module therein performing an operation, respectively, has been described in detail in the method embodiments, which will be not described in detail herein.

As shown in FIG. 10, FIG. 10 is a structural schematic view of a terminal 100 according to an embodiment of the present disclosure. The terminal 100 may include a processor 101, a receiver 102, a transmitter 103, a memory 104, and a bus 105.

The processor 101 includes one or more processing cores. The processor 101 is configured to perform various functional applications and information processing by running software programs and modules.

The receiver 102 and transmitter 103 may be integrated in a communication assembly. The communication assembly may be a communication chip. The communication chip may also be referred to as the transceiver.

The memory 104 is connected to processor 101 via the bus 105.

The memory 104 may be configured to store a computer program, and the processor 101 is configured to execute the computer program to implement each operation performed by the terminal in the method embodiments described above.

The memory 104 may be implemented by any type of volatile storage device or non-volatile storage device or a combination thereof. The volatile storage device or the non-volatile storage device may include but not limited to: a disk or an optical disk, an electrically erasable programmable read-only memory, an erasable programmable read-only memory, a static random access memory, a read-only memory, a magnetic memory, a flash memory, and a programmable read-only memory.

In an embodiment, the terminal includes the processor, the memory, and the transceiver (the transceiver may include the receiver and the transmitter, the receiver is configured to receive information and the transmitter is configured to send the information).

The transceiver is configured to perform the second UL transmission on the second resource based on the resource configuration information and/or the state associated with a first UL transmission. The resource configuration information includes at least one of the CGRT configuration and the automatic transmission configuration.

The first resource is the DG resource or the CG resource in the shared band, the second resource is the DG resource or the CG resource in the shared band, and the first resource is prior to the second resource in the time domain.

The transceiver is configured to achieve each function implemented by the transmission module 901 of the apparatus described in the embodiments corresponding to FIG. 9. The processor is configured to achieve each function implemented by the configuring module of the apparatus described in the embodiments corresponding to FIG. 9.

Each method operation performed by the terminal in some embodiments of the present disclosure may refer to all or a part of operations performed by the terminal device in the embodiments corresponding to FIGS. 2-3 above, which is not repeated herein.

A computer-readable storage medium is also provided in some embodiments of the present disclosure. The storage medium stores a computer program. The computer program is loaded and executed by the processor or the transceiver to implement each operation of the UL transmission method shown in any of FIG. 2 and FIG. 3.

A computer program product or a computer program is also provided in some embodiments of the present disclosure. The computer program product or the computer program includes computer instructions. The computer instructions are stored in the computer-readable storage medium. A processor of a computer device is configured to read the computer instructions from the computer-readable storage medium and execute the computer instructions, to cause the computer device to implement each operation of the UL transmission method shown in FIG. 2 or FIG. 3.

Those skilled in the art should be aware that in one or more of the above examples, the functions described in the embodiments of the present disclosure may be implemented by the hardware, the software, a firmware, or any combination thereof. When implemented by the software, these functions may be stored in a computer-readable medium or transmitted as one or more instructions or codes on the computer-readable medium. The computer-readable medium may include a computer storage medium and a communication medium. The communication medium includes any medium able to transmit the computer program from one place to another place. The storage medium may be any available medium accessible to a general-purpose computer or a specialized computer.

The above descriptions are simply some exemplary embodiments of the present disclosure and are not intended to limit the present disclosure. Any modification, equivalent replacement, improvement, etc. made within the spirit and the principle of the present disclosure shall fall into the scope of the present disclosure.

What is claimed is:

1. An uplink (UL) transmission method, comprising:
performing, by a terminal device, a second UL transmission on a second resource based on resource configuration information and a state associated with a first UL transmission; wherein the resource configuration information comprises at least one of a Configured Grant Repeat Timer (CGRT) configuration and an automatic transmission configuration, and the first UL transmission is performed on a first resource;
wherein the first resource is a Configured Grant (CG) resource in a shared band, the second resource is the CG resource in the shared band, and the first resource is prior to the second resource in a time domain;
wherein the performing, by a terminal device, a second UL transmission on a second resource based on resource configuration information and a state associated with a first UL transmission, comprises:
determining, by the terminal device, a first behavior corresponding to the second UL transmission based on the resource configuration information and the state associated with the first UL transmission; and
performing, by the terminal device, the second UL transmission on the second resource based on the first behavior;
wherein in response to the resource configuration information satisfying an eleventh condition and the state associated with the first UL transmission satisfying a twelfth condition, the terminal device determines that the first behavior comprises at least one of:
stopping a Configured Grant Timer (CGT);
stopping a CGRT in a case of stopping the CGT, or, stopping both the CGT and the CGRT;
determining that a status of a Hybrid Automatic Repeat ReQuest (HARQ) process is not pending;
determining that a Media Access Control Protocol Data Unit (MAC PDU) has been acquired:
requiring no new MAC PDU to be acquired from a multiplexed packetized unit; and
performing a new transmission.

2. The method according to claim 1, wherein
the CGRT configuration is configured to indicate whether a CGRT is configured therein, and
the automatic transmission configuration is configured to indicate whether an automatic transmission is configured therein; and
the state associated with the first UL transmission comprises at least one of:
whether a Listen Before Talk (LBT) failure indication corresponding to the first UL transmission is acquired;
whether a conflict indication corresponding to the first UL transmission is acquired;
whether a Downlink Feedback Indication (DFI) is acquired;
whether the first UL transmission is determined to be uncompleted;
whether the first resource is determined as a low-priority resource, a conflicting resource, or a cancelled resource;
whether the first resource is determined as a high-priority resource;
whether the CGT runs;
whether the CGRT runs;
whether the status of the HARQ process is pending or not pending; and
whether a timing duration of the CGT is equal to a timing duration of the CGRT.

3. The method according to claim 1, wherein the terminal determines, based on the resource configuration information and the state associated with the first UL transmission, that the first behavior corresponding to the second UL transmission comprises at least one of:
performing an automatic transmission;
determining that the first UL transmission is uncompleted;
determining that the first UL transmission is completed;
determining that the first resource as a low-priority resource;
determining that the MAC PDU has been acquired;
requiring no new MAC PDU to be acquired from the multiplexed packetized unit;
performing a new transmission;
performing an automatic retransmission for a MAC PDU with an uncompleted transmission on the first resource;
stopping the CGT;
stopping the CGRT;
stopping the CGRT in a case of stopping the CGT;
stopping both the CGT and the CGRT;
keeping the CGT running;
determining the status of the HARQ process is not pending;
determining the status of the HARQ process status is pending;
acquiring the new MAC PDU from the multiplexed packetized unit;
abandoning the MAC PDU with the uncompleted transmission on the first resource;
transmitting according to a retransmission;
not emptying a HARQ buffer;
determining that a New Data Indication (NDI) has no flip; and
performing the retransmission.

4. The method according to claim 1, wherein the eleventh condition comprises:
the CGRT configuration indicating that a CGRT is configured therein and the automatic transmission configuration indicating that an automatic transmission is configured therein;
wherein the twelfth condition comprises at least one of:
the first resource being determined to be a low-priority resource, a conflicting resource, or a cancelled resource;
the CGT not running;
the CGRT not running; and
the status of the HARQ process being not pending.

5. The method according to claim 1, wherein the twelfth condition further comprises at least one of:
a priority based on a logical channel being configured therein;
acquiring a conflict indication corresponding to the first UL transmission; and
failing to acquire a LBT failure indication corresponding to the first UL transmission.

6. The method according to claim 1, wherein the resource configuration information comprises resource configuration information corresponding to the second resource; or
the resource configuration information comprises resource configuration information corresponding to the first resource.

7. The method according to claim 1, wherein in response to the first behavior comprising performing an automatic transmission, the performing, by the terminal device, the second UL transmission on the second resource based on the first behavior, comprises:

performing the automatic transmission on the second resource for a packetized MAC PDU, in response to an identifier of a HARQ process of the second resource being the same as an identifier of a HARQ process of the packetized MAC PDU;

wherein the packetized MAC PDU is a MAC PDU during performing the first UL transmission on the first resource.

8. The method according to claim 1, further comprising:

determining the status of the HARQ process is pending or keeping the status of the HARQ process unchanged, in response to determining the second resource or a MAC PDU corresponding to the second resource to have a low priority, in a case of the status of the HARQ process being pending.

9. The method according to claim 1, further comprising:

determining the status of the HARQ process is pending or keeping the status of the HARQ process unchanged in response to determining the second resource or the MAC PDU corresponding to the second resource to have the low priority, in a case of the status of the HARQ process being not pending and the CGT not running.

10. A terminal, comprising:

a processor; and a memory;

wherein the memory is configured to store a computer program, and the processor is configured to invoke and execute the computer program stored in the memory, to cause the terminal to:

perform a second uplink (UL) transmission on a second resource based on resource configuration information and a state associated with a first UL transmission, wherein the resource configuration information comprises at least one of a Configured Grant Repeat Timer (CGRT) configuration and an automatic transmission configuration, and the first UL transmission is performed on a first resource;

wherein the first resource is a Configured Grant (CG) resource in a shared band, the second resource is the CG resource in the shared band, and the first resource is prior to the second resource in a time domain;

wherein the processor is configured to invoke and execute the computer program stored in the memory, to cause the terminal further to:

determine a first behavior corresponding to the second UL transmission based on the resource configuration information and the state associated with the first UL transmission; and perform the second UL transmission on the second resource based on the first behavior;

wherein in response to the resource configuration information satisfying an eleventh condition and the state associated with the first UL transmission satisfying a twelfth condition, the terminal determines that the first behavior comprises at least one of:

stopping a Configured Grant Timer (CGT);

stopping a CGRT in a case of stopping the CGT, or, stopping both the CGT and the CGRT;

determining that a status of a Hybrid Automatic Repeat ReQuest (HARQ) process is not pending;

determining that a Media Access Control Protocol Data Unit (MAC PDU) has been acquired;

requiring no new MAC PDU to be acquired from a multiplexed packetized unit; and performing a new transmission.

11. The terminal according to claim 10, wherein the CGRT configuration is configured to indicate whether a CGRT is configured therein, and the automatic transmission configuration is configured to indicate whether an automatic transmission is configured therein; and the state associated with the first UL transmission comprises at least one of:

whether a Listen Before Talk (LBT) failure indication corresponding to the first UL transmission is acquired;

whether a conflict indication corresponding to the first UL transmission is acquired;

whether a Downlink Feedback Indication (DFI) is acquired;

whether the first UL transmission is determined to be uncompleted;

whether the first resource is determined as a low-priority resource, a conflicting resource, or a cancelled resource;

whether the first resource is determined as a high-priority resource;

whether the CGT runs;

whether the CGRT runs;

whether the status of the HARQ process is pending or not pending; and whether a timing duration of the CGT is equal to a timing duration of the CGRT.

12. The terminal according to claim 10, wherein the terminal determines, based on the resource configuration information and the state associated with the first UL transmission, that the first behavior corresponding to the second UL transmission comprises at least one of:

performing an automatic transmission;

determining that the first UL transmission is uncompleted;

determining that the first UL transmission is completed;

determining that the first resource as a low-priority resource;

determining that the MAC PDU has been acquired;

requiring no new MAC PDU to be acquired from the multiplexed packetized unit;

performing a new transmission;

performing an automatic retransmission for a MAC PDU with an uncompleted transmission on the first resource;

stopping the CGT;

stopping the CGRT;

stopping the CGRT in a case of stopping the CGT;

stopping both the CGT and the CGRT;

keeping the CGT running;

determining the status of the HARQ process is not pending;

determining the status of the HARQ process status is pending;

acquiring the new MAC PDU from the multiplexed packetized unit;

abandoning the MAC PDU with the uncompleted transmission on the first resource;

transmitting according to a retransmission;

not emptying a HARQ buffer;

determining that a New Data Indication (NDI) has no flip; and performing the retransmission.

13. The terminal according to claim 10, wherein the eleventh condition comprises:

the CGRT configuration indicating that a CGRT is configured therein and the automatic transmission configuration indicating that an automatic transmission is configured therein;

wherein the twelfth condition comprises at least one of:

the first resource being determined to be a low-priority resource, a conflicting resource, or a cancelled resource;

the CGT not running;

the CGRT not running; and the status of the HARQ process being not pending.

14. The terminal according to claim 10, wherein the twelfth condition comprises at least one of:

a priority based on a logical channel being configured therein;

acquiring a conflict indication corresponding to the first UL transmission; and failing to acquire a LBT failure indication corresponding to the first UL transmission.

15. The terminal according to claim 10, wherein the resource configuration information comprises resource configuration information corresponding to the second resource; or the resource configuration information comprises resource configuration information corresponding to the first resource.

16. A non-transitory computer-readable storage medium, storing a computer program, wherein the computer program, when executed by a processor, causes the processor to implement:

performing a second UL transmission on a second resource based on resource configuration information and a state associated with a first UL transmission; wherein the resource configuration information comprises at least one of a Configured Grant Repeat Timer (CGRT) configuration and an automatic transmission configuration, and the first UL transmission is performed on a first resource;

wherein the first resource is a Configured Grant (CG) resource in a shared band, the second resource is the CG resource in the shared band, and the first resource is prior to the second resource in a time domain;

wherein the computer program, when executed by the processor, causes the processor further to implement:

determining a first behavior corresponding to the second UL transmission based on the resource configuration information and the state associated with the first UL transmission; and performing the second UL transmission on the second resource based on the first behavior;

wherein in response to the resource configuration information satisfying an eleventh condition and the state associated with the first UL transmission satisfying a twelfth condition, the processor determines that the first behavior comprises at least one of:

stopping a Configured Grant Timer (CGT);

stopping a CGRT in a case of stopping the CGT, or, stopping both the CGT and the CGRT;

determining that a status of a Hybrid Automatic Repeat ReQuest (HARQ) process is not pending;

determining that a Media Access Control Protocol Data Unit (MAC PDU) has been acquired;

requiring no new MAC PDU to be acquired from a multiplexed packetized unit; and performing a new transmission.

* * * * *